US 6,708,810 B2
Mar. 23, 2004

(54) DAMPER DISK ASSEMBLY

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/278,903

(22) Filed: Oct. 24, 2002

(65) Prior Publication Data
US 2003/0085097 A1 May 8, 2003

(30) Foreign Application Priority Data
Nov. 7, 2001 (JP) .................................... 2001-342079

(51) Int. Cl.[7] .......................... F16D 13/64; F16D 13/58
(52) U.S. Cl. .................. 192/213.22; 192/203; 192/205; 192/213.2; 464/68
(58) Field of Search .................... 192/213.22, 213.2, 192/213.21, 203, 205; 464/68

(56) References Cited

U.S. PATENT DOCUMENTS

| 5,117,959 A | * | 6/1992 | Graton | 464/68 |
| 5,450,935 A | * | 9/1995 | Rumignani et al. | 192/213.22 |
| 5,820,466 A | * | 10/1998 | Graton et al. | 464/68 |
| 5,848,937 A | * | 12/1998 | Mizukami et al. | 464/68 |
| 6,270,417 B1 | * | 8/2001 | Hashimoto | 464/68 |
| 2002/0094874 A1 | * | 7/2002 | Uehara et al. | 464/68 |

* cited by examiner

Primary Examiner—Rodney H. Bonck
(74) Attorney, Agent, or Firm—Shinjyu Global IP Counselors, LLP

(57) ABSTRACT

A clutch disk assembly 1 is provided with a hub flange 7, a pair coil springs 8, a pair of coil springs 9, an intermediate rotary member 10, and a pair of plates 12 and 13. The hub flange 7 has a boss 7a and an integrally formed flange 7b. The flange 7b has a pair of first window holes 7c and a pair of second window holes 7b. The two coil springs 8 are arranged respectively in the pair of first window holes 7a. The more rigid two coil springs 9 are arranged respectively in the pair of second window holes 7b and window parts 25 of the plates 12 and 13. The intermediate rotary member 10 couples the coil springs 8 and the coil springs 9 together in the rotational direction. The two plates 12 and 13 are arranged on both axially facing sides of the flange 7b.

23 Claims, 22 Drawing Sheets

DAMPER DISK ASSEMBLY

BACKGROUND OF THE INVENTION

1. Field of the Invention

The present invention relates to a damper disk assembly. More specifically, the present invention relates to a damper disk assembly exhibiting a torque characteristic that has two stages of rigidity.

2. Background Information

A conventional damper mechanism used in a clutch disk assembly of a vehicle has an input rotary member, an output rotary member, and an elastic coupling member. The input rotary member is designed to be coupled to an input flywheel to transfer torque therefrom to the output rotary member. The output rotary member is coupled to a shaft that extends from a transmission. The elastic coupling member elastically couples the input rotary member and the output rotary member together in the rotational direction. The input rotary member has a clutch disk and a pair of input plates fixed to the inside thereof. The output rotary member has a hub that is coupled to the shaft in such a manner that the two cannot rotate relative to each other. The hub has a boss that is splined to the shaft and a flange that extends radially outward from the boss. The elastic coupling mechanism has a plurality of coil springs. Each coil spring is housed inside a window hole formed in the flange and is also supported by corner windows formed in the pair of input plates. When the pair of input plates and the hub rotate relative to each other, the coil springs are compressed between the input plates and hub in a rotational direction. This compressing or damping function serves to absorb and damp torsional vibrations inputted to the clutch disk assembly.

Also known are clutch disk assemblies that use springs of different rigidities to accommodate the various types of vibrations that occur under different traveling conditions. This type of clutch disk assembly achieves a two-stage torsional characteristic. The small coil springs are compressed and a low-rigidity characteristic is obtained when in the region of small twisting angles. Further, the large coil springs are compressed and a high-rigidity characteristic is obtained when in the region of large twisting angles. One known structure for achieving this characteristic is a separated flange type clutch disk assembly in which the flange is independently formed from the hub and the flange and hub are coupled together in the rotational direction by small, low-rigidity coil springs. Also known is an integral type clutch disk assembly in which window holes for large coil springs and window holes for small coil springs are provided in an integral hub flange unit and coil springs are arranged in the window holes.

The separated flange type clutch disk assembly can achieve a wide-angle, low-rigidity torsional characteristic. However, since both a hub and a flange are required, the number of parts is greater than in clutch disk assemblies whose flanges are not separated. Thus, separated flange type clutch disk assemblies have a higher cost.

In the integral type clutch disk assembly, the twisting angle is determined by the rotational angle between the notches in the hub flange and the stop pins arranged in the notches. Furthermore, since four to six large coil springs are arranged in the rotational direction, the notches cannot be made sufficiently large, i.e., a sufficient twisting angle cannot be secured because of the relatively large number of coil springs. Consequently, a small-angle, high-rigidity torsional characteristic is obtained.

In view of the above, there exists a need for a damper disk assembly that overcomes the above mentioned problems in the prior art. This invention addresses this need in the prior art as well as other needs, which will become apparent to those skilled in the art from this disclosure.

SUMMARY OF THE INVENTION

An object of the present invention is to provide a damper disk assembly having a simple structure and a wide twisting-angle torsional characteristic.

A damper disk assembly in accordance with a first aspect of the present invention is provided with a hub flange, a pair of first elastic members, a pair of second elastic members, an intermediate rotary member, and a pair of plate members. The hub flange has a boss that can be coupled to a shaft and a flange formed integrally on the outer circumference of the boss. The flange has formed therein a pair of first window holes arranged radially opposite each other and a pair of second window holes arranged radially opposite each other. The two first elastic members are arranged respectively in the pair of first window holes. The two second elastic members have a higher rigidity than the first elastic members and are arranged respectively in the pair of second window holes. The intermediate rotary member couples the first elastic members and the second elastic members together in the rotational direction. The two plate members are arranged on both axially facing sides of the flange and have a support part that supports the second elastic members.

This damper disk assembly uses the pair of second elastic members, which are positioned opposite each other in the radial direction, as the springs for transmitting power and absorbing vibrations when the vehicle is traveling. Consequently, the problem of the limited angle between the stop pins and notches is solved and a wide-twisting angle torsional characteristic can be achieved.

Meanwhile, the two first elastic members, which are arranged in the first window holes of the flange, are used as the springs for absorbing small torsional vibrations during idling. Since the hub flange is a single unitary member, the number of parts does not increase.

A damper disk assembly in accordance with a second aspect of the present invention is a damper disk assembly of the first aspect, wherein the intermediate rotary member has a first member arranged on one axially facing side of the flange and a second member arranged on the opposite axially facing side of the flange. The second member has a protruding part that protrudes toward the first member in the axial direction and engages with the first member such that the two members cannot rotate relative to each other.

In this damper disk assembly, the intermediate rotary member, which couples the pair of first elastic members and the pair of second elastic members in the rotational direction, has two members, a first member and a second member. The second member has a protruding part that engages with the first member. Consequently, conventional sub-pins can be omitted and cost can be reduced by reducing the number of parts.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

(1) Constitution

Figure 1:
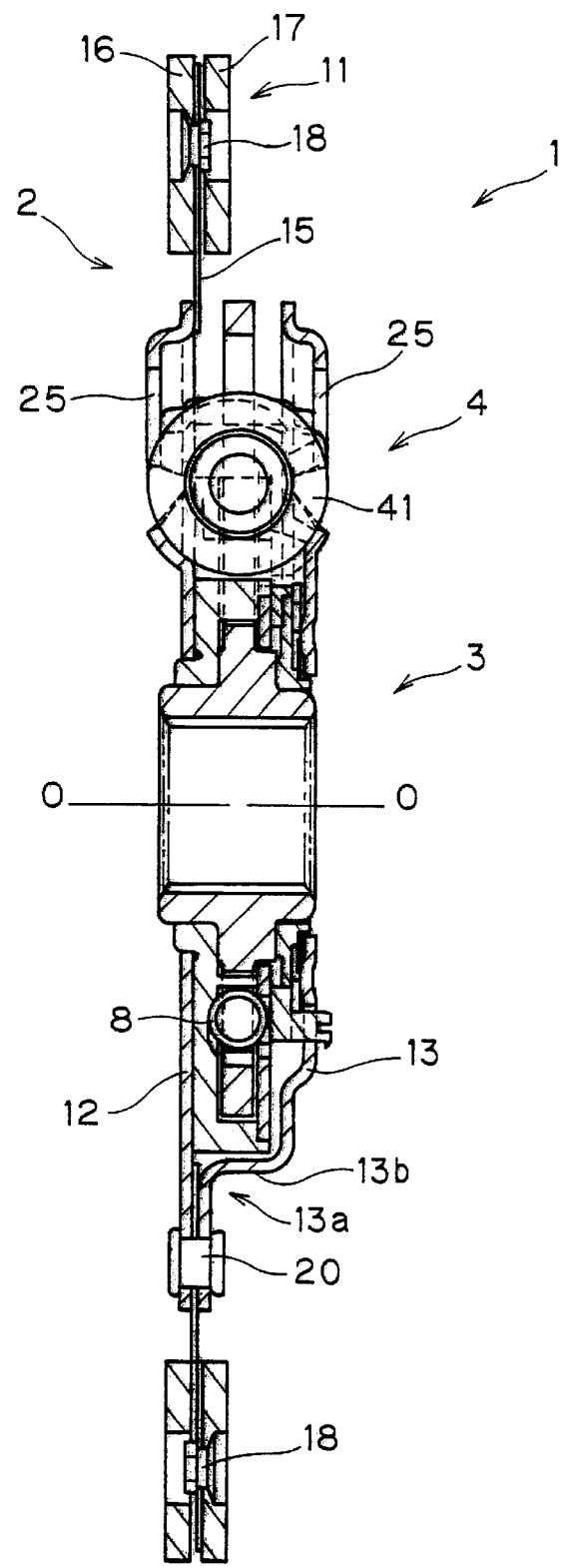
FIG. 1 is a vertical cross-sectional view of a clutch disk assembly in accordance with a preferred embodiment of the present invention.
Figure 2:
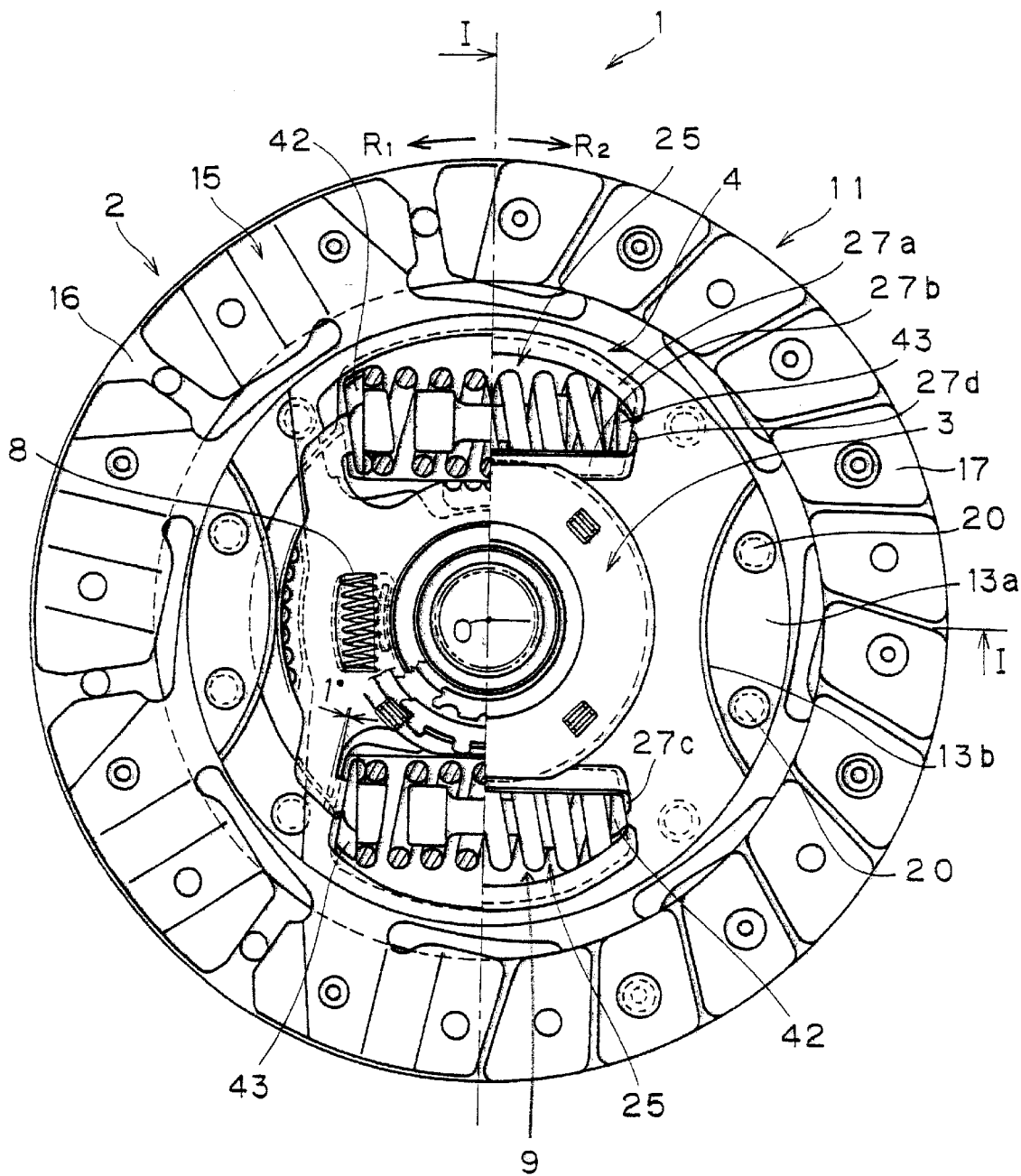
FIG. 2 is an elevational view of the clutch disk assembly with a portion removed for illustrative purposes.

FIG. 1 is a cross-sectional view of a clutch disk assembly 1 of a preferred embodiment of the present invention and FIG. 2 is an elevational view of the same. The clutch disk assembly 1 is a power transmission device used in a clutch apparatus of a vehicle and has both a clutch function and a damper function. The clutch function is provided to transmit and interrupt torque by engaging and disengaging with a flywheel (not shown). The damper function is provided so that by using springs or the like torque fluctuations inputted from the flywheel are absorbed and dampened.

In FIG. 1, line O—O is the rotational axis of the clutch disk assembly 1. An engine and a flywheel (both not shown) are disposed to the left in FIG. 1 and a transmission (not shown) is disposed to the right in FIG. 1. In FIG. 2, arrow R1 indicates a drive direction or positive rotation direction of the clutch disk assembly 1 and arrow R2 indicates the opposite direction or negative rotation direction. In the following explanation, the terms "rotational (circumferential) direction," "axial direction," and "radial direction" are used to describe the directions of the clutch disk assembly 1, which serves as a damper mechanism, unless a more specific direction needs to be described. Also, rotational angles and other actual numerical values used in the following explanation are merely used to describe, for example, the relative size of the angles and are not intended to limit the present invention.

As seen in FIGS. 1 and 2, the clutch disk assembly 1 chiefly has an input rotary body 2, an output rotary body 3, and an elastic coupling part 4 disposed between the input rotary body 2 and the output rotary body 3. The input rotary body 2 is a member to which torque is inputted from the flywheel (not shown). The input rotary body 2 chiefly has a clutch disk 11, a clutch plate 12, and a retaining plate 13. The clutch disk 11 is the portion that is pressed against and couples with the flywheel (not shown). The clutch disk 11 has a cushioning plate 15 and a pair of friction facings 16 and 17 that are fixed to both axially facing sides of the cushioning plate 15 by rivets 18.

The clutch plate 12 and the retaining plate 13 are both preferably disk-shaped, ring-shaped members made of sheet metal and are disposed at a prescribed distance from each other in the axial direction. The clutch plate 12 is disposed on the engine side and the retaining plate 13 is disposed on the transmission side. A pair of coupling parts 13a that are preferably made by drawing and protrude toward the clutch plate 12 are provided on a portion of the retaining plate 13 positioned radially to the outside of coil springs 8 arranged in a hub flange 7. Each of the coupling parts 13a is fixed to the clutch plate 12 by a plurality of rivets 20. The retaining plate 13 is also provided with wall parts 13b that extend in the axial direction between the coupling parts 13a and the rest of the retaining plate 13. The clutch plate 12 and the retaining plate 13 are each formed with a center hole. The hub flange 7 (discussed later) is disposed inside these center holes.

Figure 5:
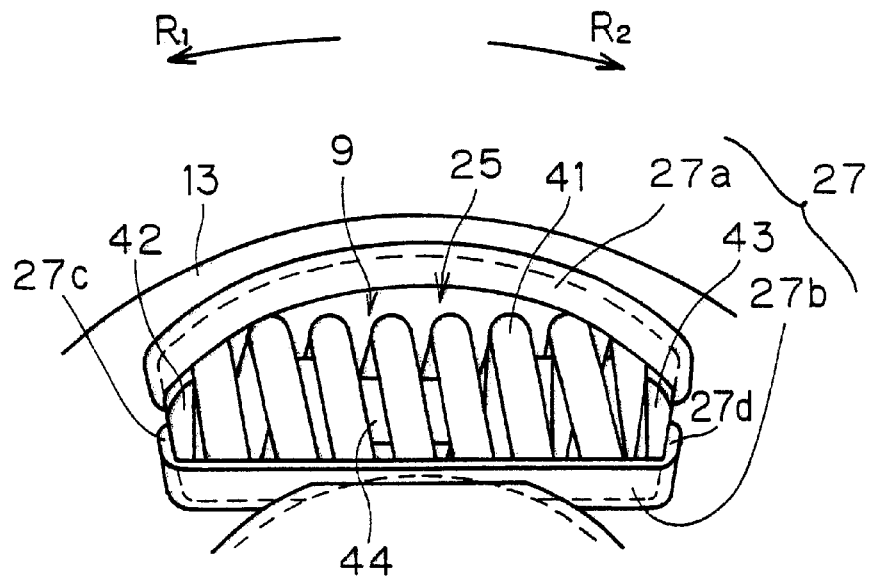
FIG. 5 is an elevational view of window holes of plates of the clutch disk assembly.

A plurality of window parts 25, arranged in the circumferential direction, is formed in the clutch plate 12 and the retaining plate 13. More specifically, in each plate 12 and 13, there are preferably two window parts 25 formed so that they oppose each other in the radial direction. The positions are preferably symmetrical with respect to the center axis O–O. As shown in FIG. 5, each of the window parts 25 of the plate 12 or 13 has a hole that is long in the circumferential direction. In other words, the maximum distance from one end of the window part 25 to the other in the circumferential direction is longer than the maximum distance from one end to the other in the radial direction. The hole of each window part 25 passes through the plate 12 or 13 in the axial direction. Further, a spring support part 27 is formed along the edge of the hole. The spring support part 27 has an outside support part 27a, an inside support part 27b, and rotational direction support parts 27c and 27d. The outside support part 27a is preferably curved into a shape that lies roughly on a circle that is concentric with the plates 12 and 13 and the inside support part 27b extends substantially in a straight line. The rotational support part 27c is on the R1 side of the window part 25 and the rotational support part 27d is on the R2 side. The rotational direction support parts 27c and 27d extend along straight lines lying roughly on radii of the plates 12 and 13. The entirety of the outside support part 27a and the portions of the rotational direction support parts 27c and 27d that are farther from the center axis of the clutch disk assembly 1 preferably have raised parts that support the spring seats 42 and 43 in the axial direction.

Figure 3:
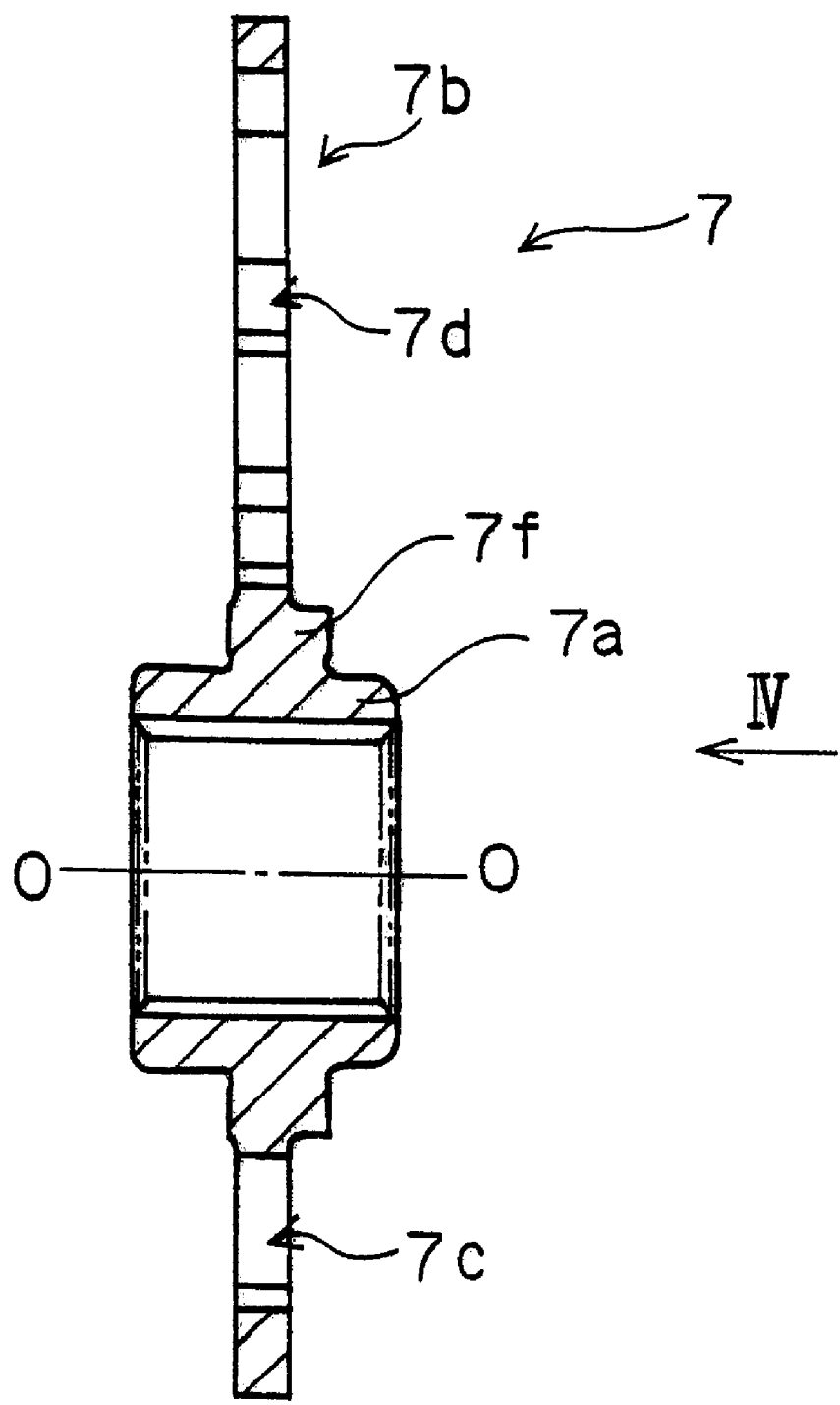
FIG. 3 is a vertical cross-sectional view of a hub flange of the clutch disk assembly.
Figure 4:
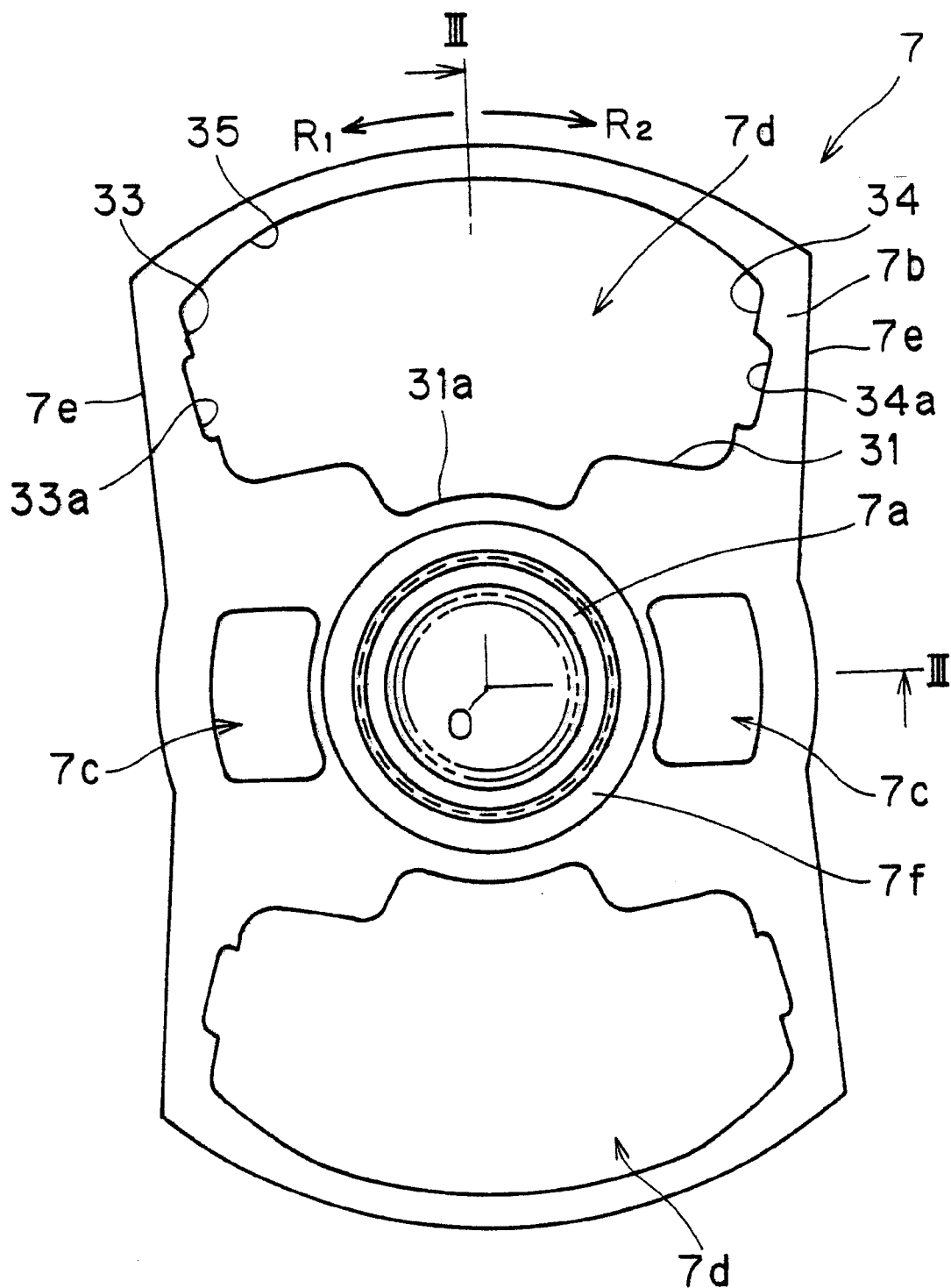
FIG. 4 is an elevational view of the hub flange.

The output rotary body 3 will now be explained. Referring to FIGS. 1 and 3, the output rotary body 3 chiefly has the hub flange 7. The hub flange 7 is a member that is disposed inside the center holes of the clutch plate 12 and the retaining plate 13. The hub flange 7 is splined to the transmission input shaft (not shown), which is inserted into the center hole of the hub flange 7. As shown in FIGS. 3 and 4, the hub flange 7 has a boss 7a and a flange 7b formed integrally on the outer circumferential surface thereof. The flange 7b has the shape of a flat plate but it is preferably not circular. Rather, the flange 7b is comparatively elongated in one radial direction. In other words, it has the shape of a circular material that has been cut in a substantially parallel manner on both sides. More preferably, the hub flange 7 has an outline resembling the shape of a bow of bowtie. The distance in a circumferential direction between end faces 7e on opposing sides of a second window hole 7d preferably increases as the radial distance from the boss 7a increases. Further, the end faces 7e on the same side of one of the second window holes 7d are joined by a curved portion that protrudes in a radial direction opposite the boss 7a. Preferably, a pair of first window holes 7c and a pair of second window holes 7d are formed on the flange 7b. The two first window holes 7c are arranged radially opposite each other in the small diameter section (i.e., the portion to the left and right sides of the boss 7a in FIG. 4) of the flange 7b. The coil springs 8 are preferably arranged inside the first window holes 7c. The two second window holes 7d are arranged radially opposite each other in the large diameter section (i.e., the portion above and below the boss 7a in FIG. 4) of the flange 7b. Each window hole 7d stretches substantially across the entire width of the large diameter portion and occupies an angle of 80 degrees in the circumferential direction. The two first window holes 7c are preferably out of phase by 90 degrees with respect to the second pair of window holes 7d.

Figure 6:
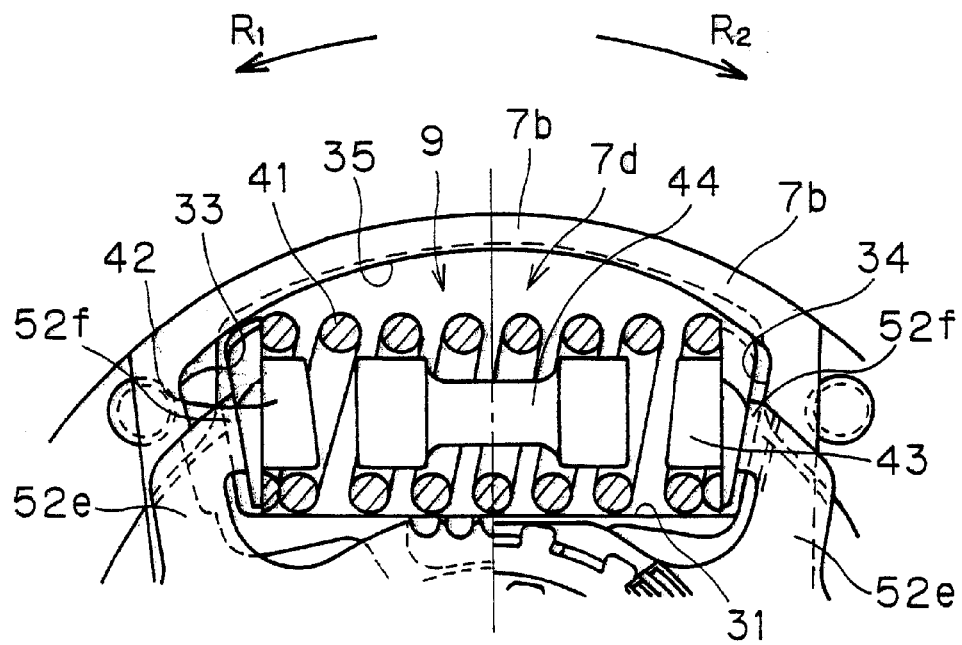
FIG. 6 is an elevational view of a second window hole of the hub flange.

The second window holes 7d of the flange 7b are formed so as to correspond to the window parts 25 in plates 12 and 13. As shown in FIGS. 4 and 6, each second window hole 7d has an outside support part 35, an inside support part 31, and rotational direction support parts 33 and 34. The rotational direction support part 33 is disposed on the R1 side and the rotational direction support part 34 is disposed on the R2 side. The outside support part 35 is curved so as to lie on a circle having its center at the center axis of the clutch disk assembly 1. The rotational direction support part 33 and the rotational direction support part 34 extend substantially linearly so as to lie roughly on radii extending from the center of the clutch disk assembly 1. Further, recessed parts 33a and 34a are formed in the middle section of the rotational direction support parts 33 and 34, respectively. Each recessed part 33a, 34a is of a shallow cut-out shape whose depth runs in the circumferential direction of the clutch disk assembly 1. In other words, each recessed part 33a and 34a is concave in a circumferential direction in relation to the inside of the second window hole 7d. More specifically, the recessed part 33a occupies an angle of 2 degrees in the circumferential direction, which corresponds to the thickness of a bent claw 52f of a plate 52 of an intermediate rotary member 10 (discussed later). The recessed part 34a occupies an angle of 3 degrees in the circumferential direction, which is 1 degree larger than the thickness of the bent claw 52f and allows the bent claw 52f to move 1 degree within the recessed part 34a.

A recessed part 31a is formed in the middle section of the inside support part 31. The recessed part 31a is a cut-out portion that is closer to the center of the clutch disk assembly 1 than the rest of the inside support part 31. In other words, the recessed part 31a is generally recessed in a radial direction relative to the inside of the second window hole 7d. The recessed part 31a preferably has two end sections that extend in a radial direction. The end sections are joined by a curved section that is convex relative to the inside of the second window hole 7d. The curved section preferably does not extend past the inside support part 31 in a radial direction toward the inside of the second window hole 7d.

Referring to FIGS. 2 and 6, the elastic coupling part 4 chiefly has a plurality of coil spring assemblies 9. There are preferably two coil spring assemblies 9. Each coil spring assembly 9 is disposed inside a second window hole 7d and a window part 25. Each coil spring assembly 9 has a coil spring 41, a pair of spring seats 42 and 43 provided on the both ends of the coil spring 1, and a float body 44. The cross section of the wire of the coil spring 41 is circular and both ends of the coil spring form closed-end end windings. The center axis of the coil spring 41 is roughly linear. The face part of the end windings has preferably been ground smooth.

The spring seats 42 and 43 are preferably made of rigid resin, elastic resin material, or metal. As shown in FIGS. 26 to 29, the spring seats 42 and 43 have a seat part 46 and a protruding part 47 that is structured to extend inside the coil spring 41 from the seat part 46. The seat part 46 has a seat surface 46a for bearing the end winding face parts of the coil spring 41 and a rear surface 46b for being supported by the second window hole 7d or the window part 25. The protruding part 47 has a roughly solid cylindrical shape. The tip face of the protruding part 47 is straight and runs parallel to the axial direction, but in a side elevational view, as seen in FIG. 6, it is slanted such that the portion that is farther from the center axis of the clutch disk assembly 1 is positioned closer to the outside of the second window hole 7d in the circumferential direction than is the portion that is closer to the center axis of the clutch disk assembly 1.

Figure 26:
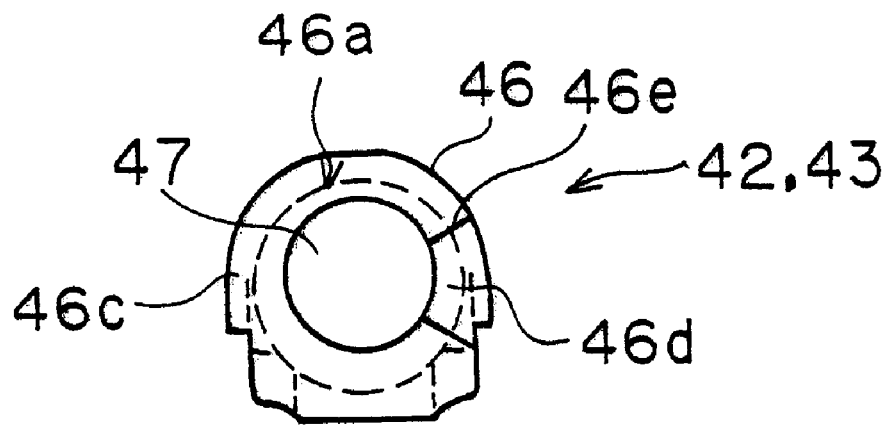
FIG. 26 is an elevational view of a spring seat of the coil spring assembly.

As is clear in FIG. 26, the seat surface 46a is preferably circular. The seat surface 46a has a roughly flat first surface 46a and a slanted second surface 46d that gradually becomes higher as one moves from one end thereof to the other (the clockwise direction in the elevational view of FIG. 26. One end of the second surface 46d is formed so as to blend uninterruptedly with the first surface 46c while the other end forms a step with respect to the first surface 46c. On this step portion is formed a contact surface 46e that faces in the circumferential direction (clockwise in the elevational view). The shape of the seat surface 46a matches the shape of the end winding face parts of the coil spring 41. When the end winding has not been significantly ground, it is acceptable for the seat surface 46a to have a curved cross section that matches the cross section of the coil. The tip end part of the coil spring 41 preferably touches against the contact surface 46e of the spring seat 42.

Since the spring seat 42 and the spring seat 43 have substantially the same shape, their respective contact surfaces 46e face in opposite directions in terms of the circumferential direction of the seat surface when the two the spring seats 42 and 43 are arranged facing each other.

Figure 27:
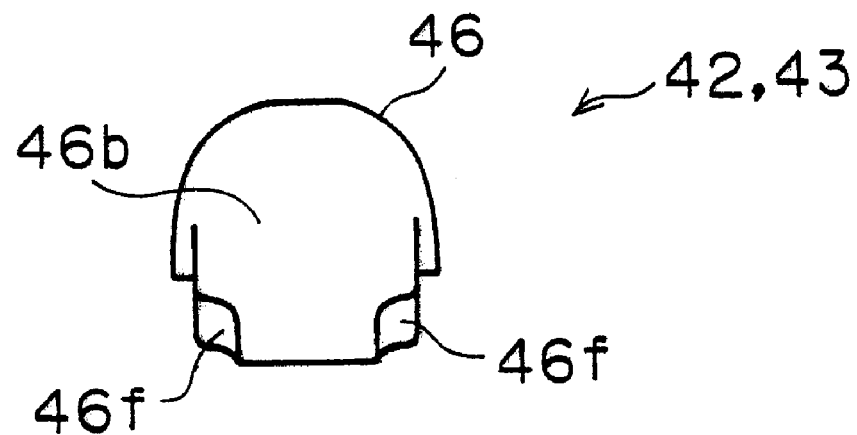
FIG. 27 is a rear elevational view of the spring seat.
Figure 28:
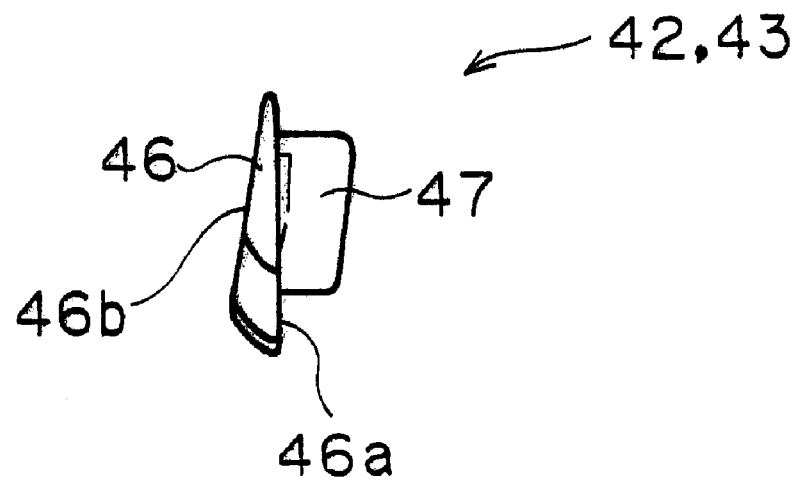
FIG. 28 is a lateral elevational view of the spring seat.
Figure 29:
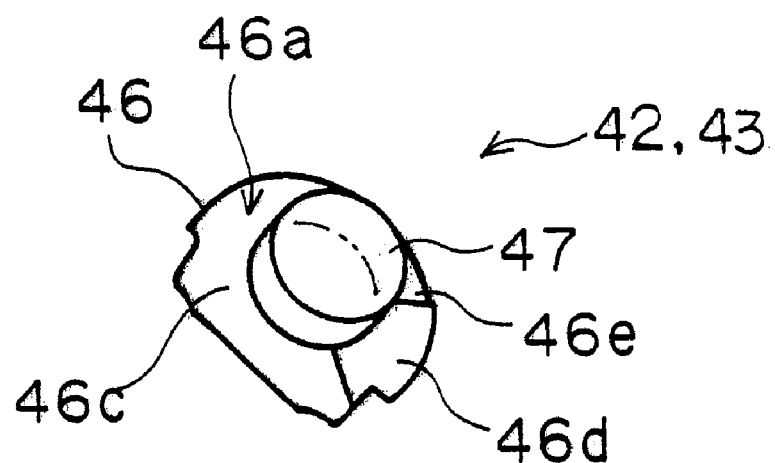
FIG. 29 is a perspective view of the spring seat.

As seen in FIG. 27, two recessed parts 46f, one at each corner, are formed on the radially outward facing side of the rear surface 46b of the spring seat 42. A portion of the outside support part 27a of the window part 25 engages with these recessed parts 46f. As a result, the spring seats 42 and 43 can separate from the circumferentially facing edges of the window parts 25 in the rotational direction (toward the opposite circumferentially facing edge) but, when engaged with the outside support part, they cannot move in the axial direction or radial direction.

Figure 18:
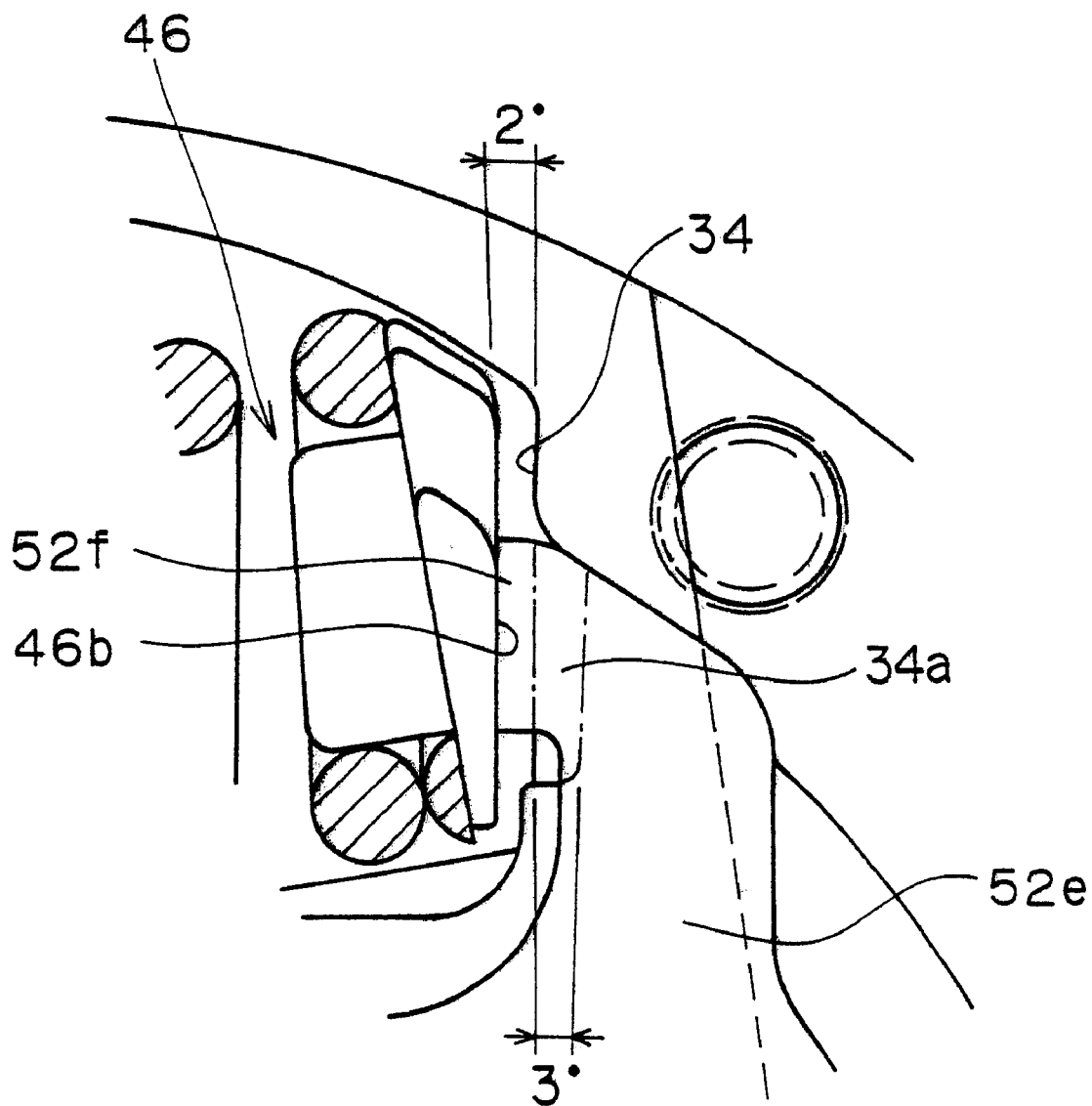
FIG. 18 is an enlarged elevational view of an end part of a coil spring assembly of the clutch disk assembly.
Figure 19:
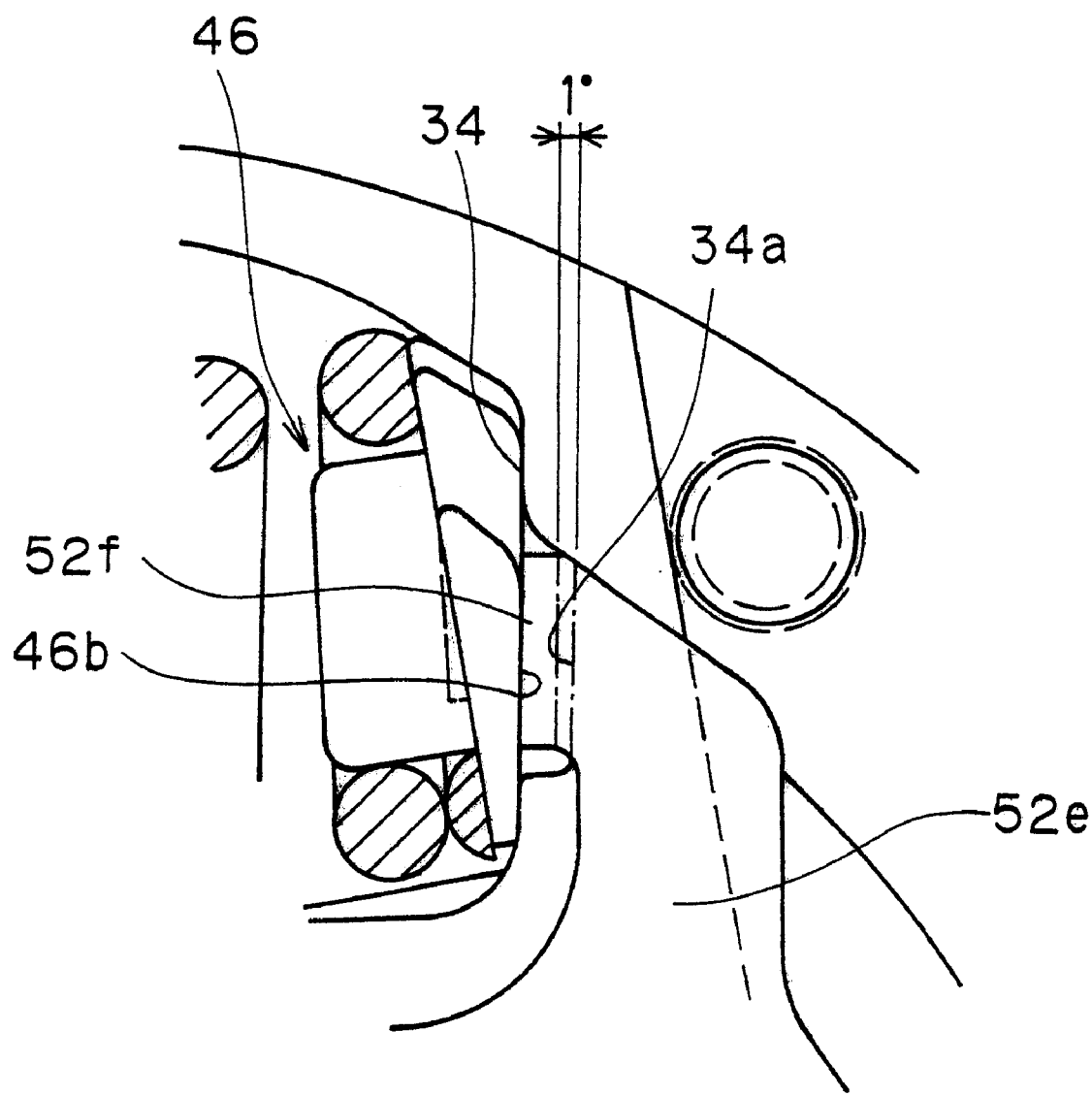
FIG. 19 corresponds to FIG. 18 and serves to illustrate the twisting operation of the damper mechanism.
Figure 20:
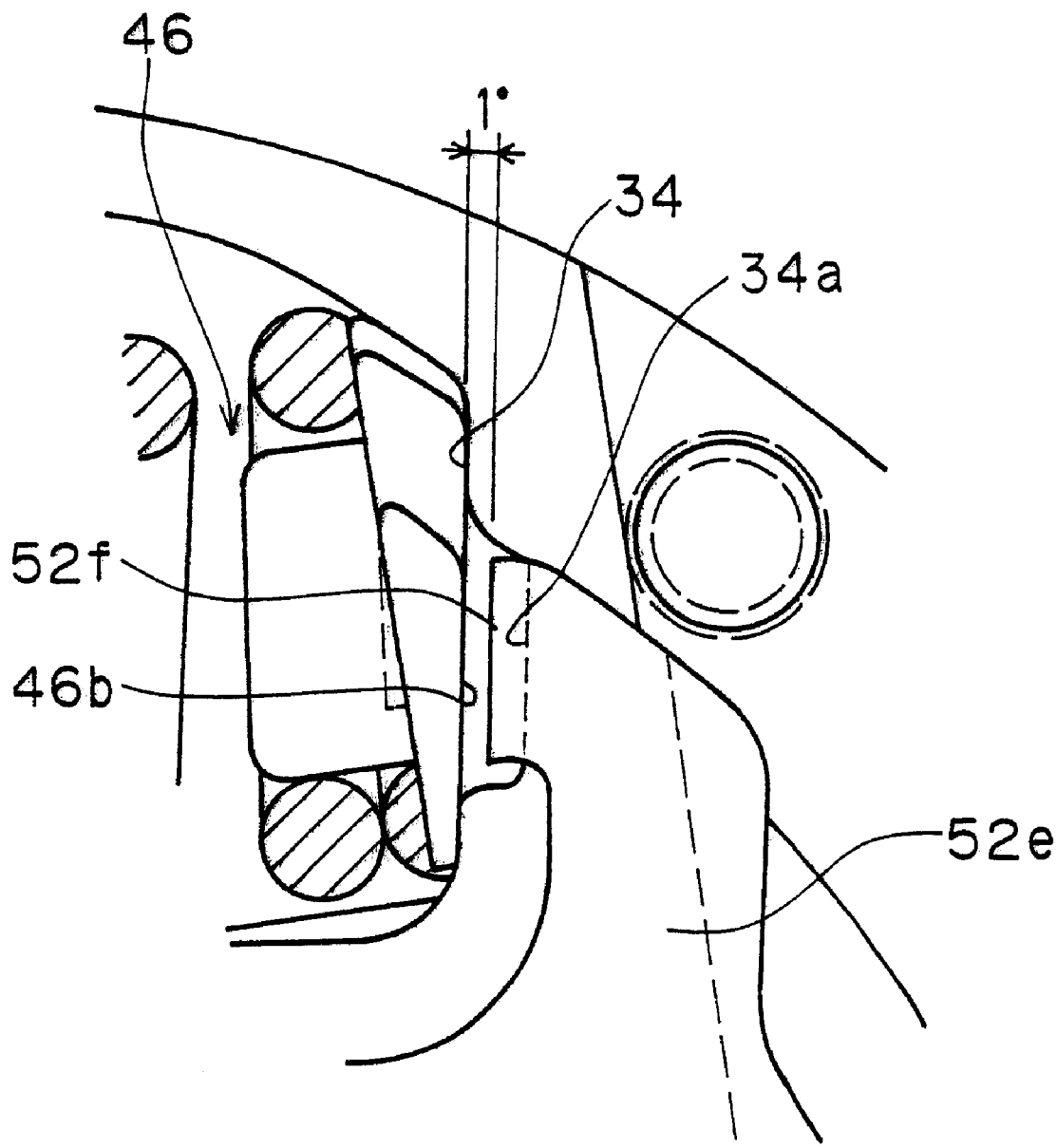
FIG. 20 corresponds to FIG. 18 and serves to illustrate further the twisting operation of the damper mechanism.

As seen in FIGS. 6, 18, and 19, the spring seats 42 and 43 are also supported by the bent claws 52f of the intermediate rotary member 10 (discussed later). More specifically, each rear surface 46b touches against the inside circumferentially facing surface of a bent claw 52f. Consequently, the rear surface 46b of each spring seat 42 and 43 is disposed so as to be separated from the rotational support part 33 or 34 of the second window hole 7d by a prescribed angle. More specifically, a rotational angular gap of 7 degrees is secured between the rotational support part 33 and the spring seat 42 and a rotational angular gap of 2 degrees is secured between the rotational support part 34 and the spring seat 43.

The entire surface of each circumferentially facing end face of the coil spring 41 touches against the seat surface 46a of the seat part 46. Moreover, the tip end parts of the coil spring 41 touch against the contact surfaces 46e. Consequently, the coil spring 41 cannot rotate about its own center axis with respect to the pair of the spring seats 42 and 43. That is, the coil spring 41 cannot rotate in either direction about its center axis because the contact surfaces 46e of the pair of the spring seats 42 and 43 face in opposite directions with respect to the winding direction of the coil spring 41. In this condition, there are preferably seven active windings on the side of the coil spring 41 that is closer to the center axis of the clutch disk assembly 1 and six active windings on the side that is farther from the center axis of the clutch disk mechanism. That is, the number of active windings on the side that is closer to the center axis of the clutch disk mechanism is preferably larger than the number of active windings on the side that is farther from the center axis of the clutch disk mechanism. Furthermore, the coil spring 41 does not rotate with respect to the spring seats 42 and 43 about the spring center axis and the spring seats 42 and 43 do not rotate with respect to the plates 12 and 13 about the spring center axis. Consequently, the coil spring 41 does not move out of position and, thus, the number of active windings on the side that is closer to the center axis of the clutch disk mechanism is always larger than the number of active windings on the side that is farther from the center axis of the clutch disk mechanism.

The float body 44 is, for example, a solid-cylindrical member preferably made of elastic resin that is arranged inside the coil spring 41 such that it can move in the rotational direction. The float body 44 serves to generate a large torque or stopper torque by being pinched between the protruding parts 47 of the spring seats 42 and 43 when the coil spring 41 is compressed beyond a certain point.

Referring to FIGS. 2 and 4, both rotationally facing end faces 7e of the portion of the hub flange 7 where the second window hole 7d is formed are of a linear shape and arranged so as to have a rotational gap with respect to the rotationally facing end faces of the wall parts 13b of the coupling parts 13a of the retaining plate 13. This rotational gap is the operational angle of the coil springs 8 and coil spring assemblies 9. Further, the end faces 7e of the hub flange 7 and the coupling parts 13a constitute a stopper mechanism of the second stage of the torsional characteristic. With this arrangement, the clutch disk assembly 1 can be made more lightweight because it is not necessary to use stopper pins.

Figure 13:
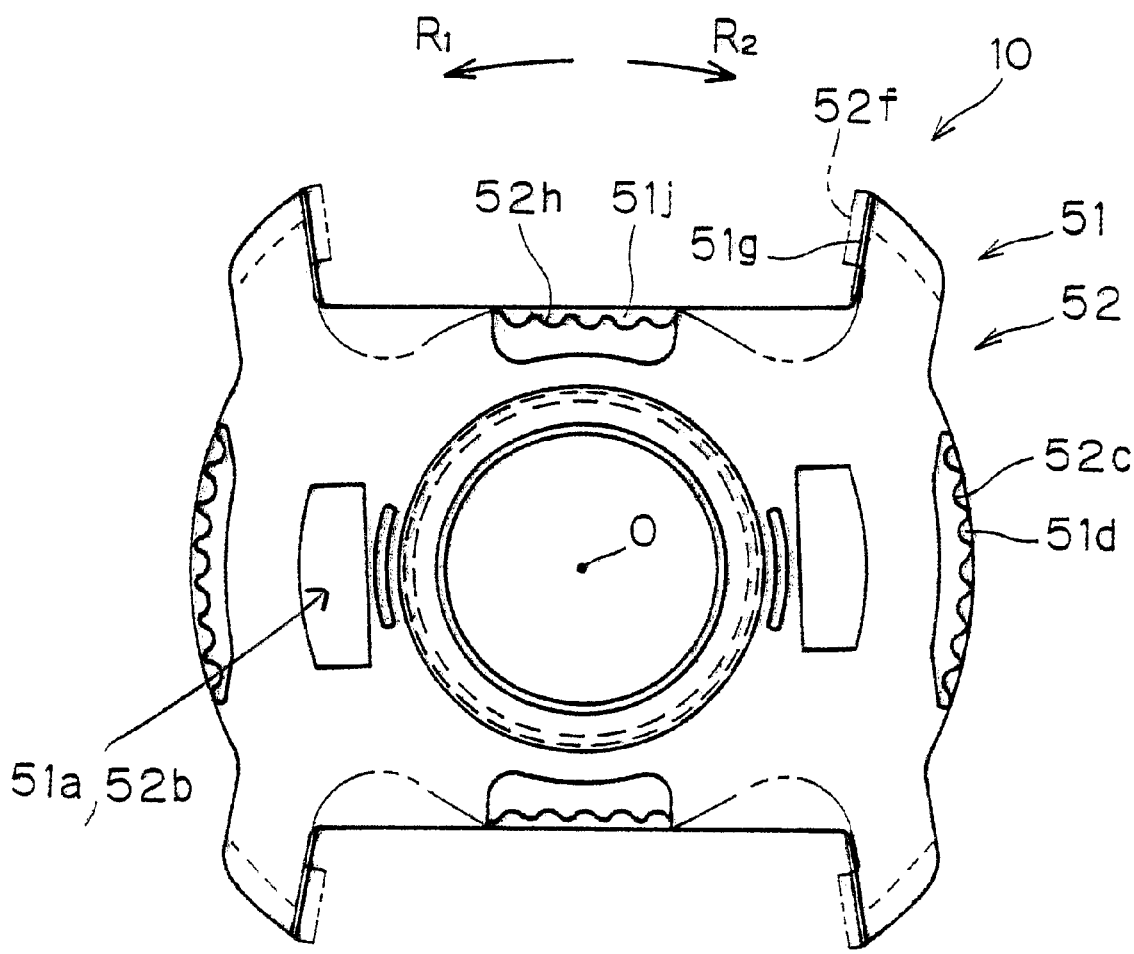
FIG. 13 is an elevational view illustrating the engagement between the first member and the second member of the intermediate rotary body.

Next, as seen in FIG. 13, the intermediate rotary member 10 is described. The intermediate rotary member 10 serves to couple the coil springs 8 and coil spring assemblies 9 together in the rotational direction. The intermediate rotary member 10 has a bush 51 and the plate 52. The bush 51 is an annular member preferably made of a material such as resin, and, as shown in FIG. 11, disposed between the flange 7b and an inner circumferential section of the clutch plate 12.

Figure 7:
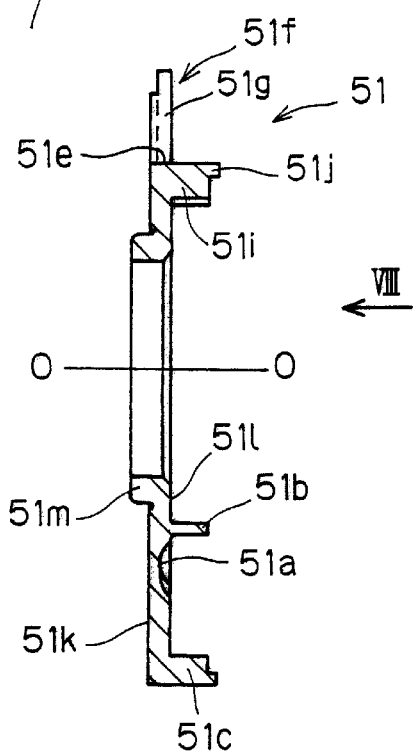
FIG. 7 is cross-sectional view of a first member of an intermediate rotary member of the clutch disk assembly.
Figure 8:
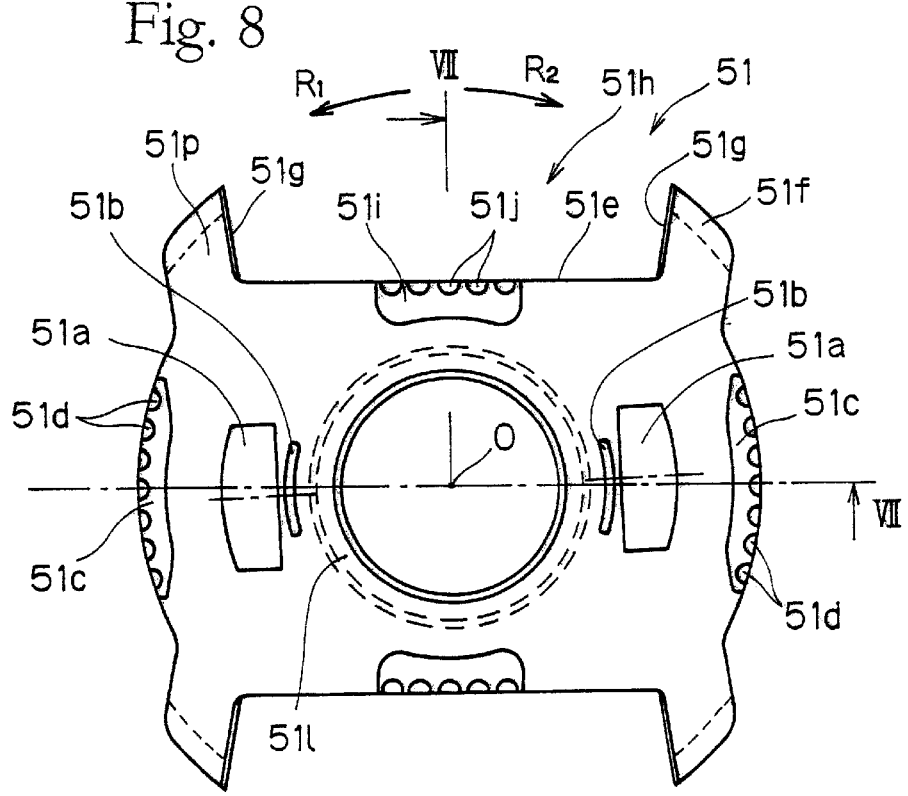
FIG. 8 is an elevational view of the first member of the intermediate rotary member.

As shown in FIGS. 7 and 8, the bush 51 has a pair of window parts 51a in positions corresponding to the first window holes 7c. The window parts 51a are recessed parts formed in the lateral face of the flange 7b. Further, the portion of the coil springs 8 that face the engine in the axial direction are arranged in the window parts 51a. Projections 51b that extend in the axial direction are formed adjacent to each window part 51a on the side thereof that faces radially inward toward the center axis of the clutch disk assembly 1. Each projection 51b has a thin-walled form that is arced in the rotational direction and is positioned within a first window hole 7c on the side of the coil spring 8 that faces radially inward toward the center axis of the clutch disk assembly 1. A pair of first fixing parts 51c that extend in the axial direction are formed on the outer edge at positions located radially outward from the window parts 51a. The first fixing parts 51c have a prescribed length in the circumferential direction and a plurality of semicircular projecting parts 51d lined up in the circumferential direction formed on the edge thereof.

A pair of linear parts 51e positioned radially opposite each other is formed on the outer edge of the bush 51 at positions 90 degrees out of phase with the pair of the first fixing parts 51c. The linear parts 51e are relatively long and preferably parallel to each other. Projections 51f that protrude outward are formed at both ends of each linear part 51e. A spring housing space 51h is formed by the linear part 51e and opposing end faces 51g of the projections 51f. A second fixing part 51i that protrudes in the axial direction is formed in the center section of the linear part 51e. The second fixing part 51i extends inside the recessed part 31a of the second window hole 7d. The second fixing part 51i has a prescribed width in the direction parallel to the linear part 51e. The prescribed width of the second fixing part 51i is preferably smaller than the length of the linear part 51e. The second fixing part 51i has a wall surface that extends straight in the axial direction on the side facing the spring housing space 51h. Also, a plurality of semicircular projecting parts 51j is formed on the tip of the second fixing part 51i so as to extend in the axial direction and line up in the direction parallel to the linear part 51e.

Figure 11:
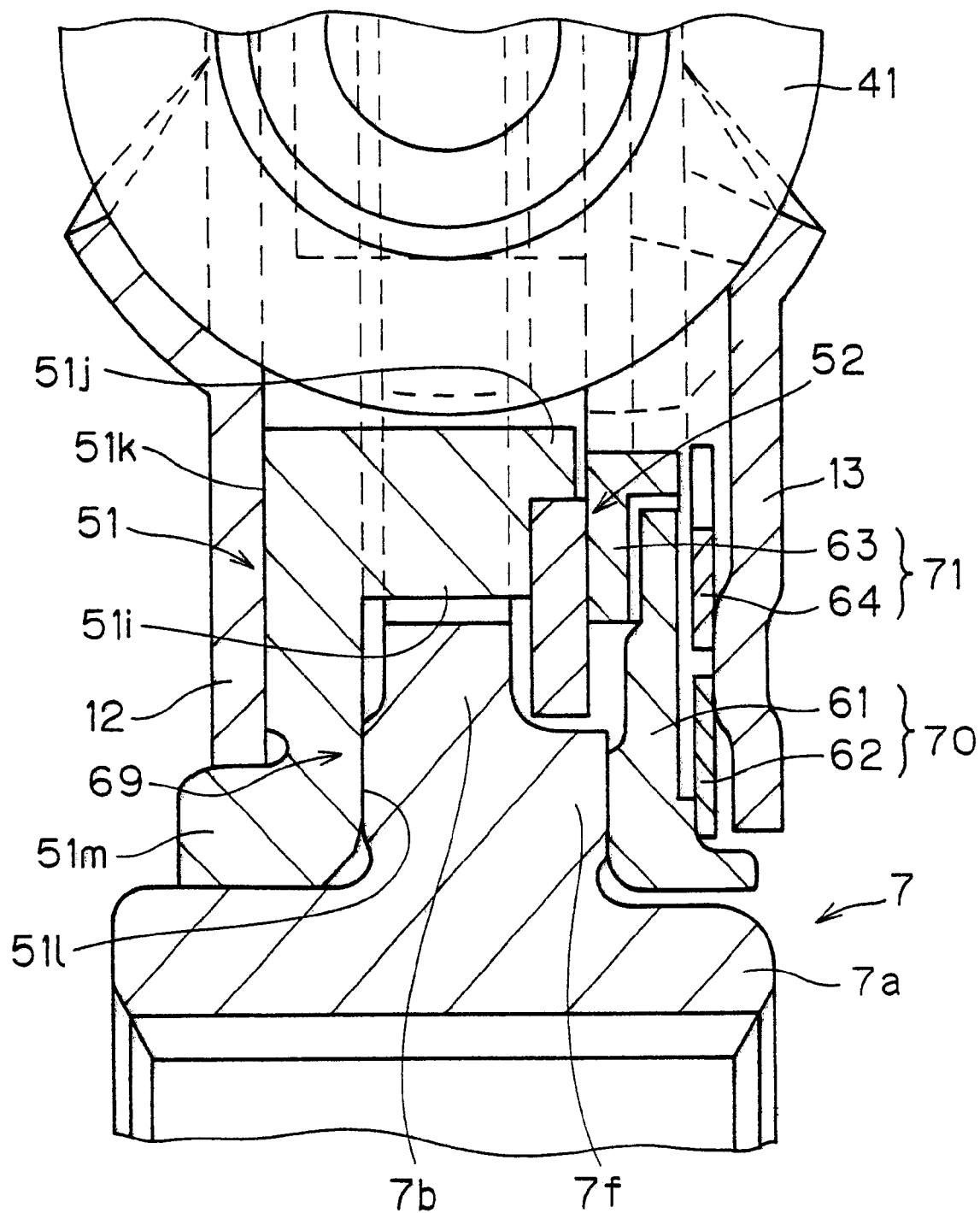
FIG. 11 is an enlarged partial view of FIG. 1.

Referring to FIGS. 7 and 11, a surface 51k of the bush 51 faces the engine in the axial direction and touches against the lateral face of the clutch plate 12 near the center hole of the clutch plate 12. A surface 51l of the bush 51 faces the transmission in the axial direction and occupies the innermost portion of the bush. The surface 51l touches against the surface of an innermost section 7f of the flange 7b that faces the engine in the axial direction. An annular part 51m that protrudes toward the engine in the axial direction is provided on the innermost edge of the bush 51. The annular part 51m is sandwiched between the internal surface of the center hole of the clutch plate 12 and the external surface of the boss 7a. The annular part 51m serves to position the plate 12 with respect to the boss 7a in the radial direction. As seen in FIG. 8, a straight line joining the centers of the window parts 51a is not parallel to the linear part 51e but is displaced slightly in the R1 rotational direction. The straight line is preferably displaced by 2 degrees.

Figure 9:
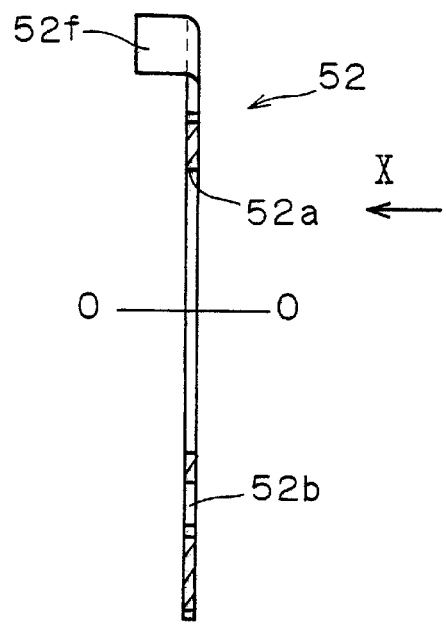
FIG. 9 is cross-sectional view of a second member of the intermediate rotary member.
Figure 10:
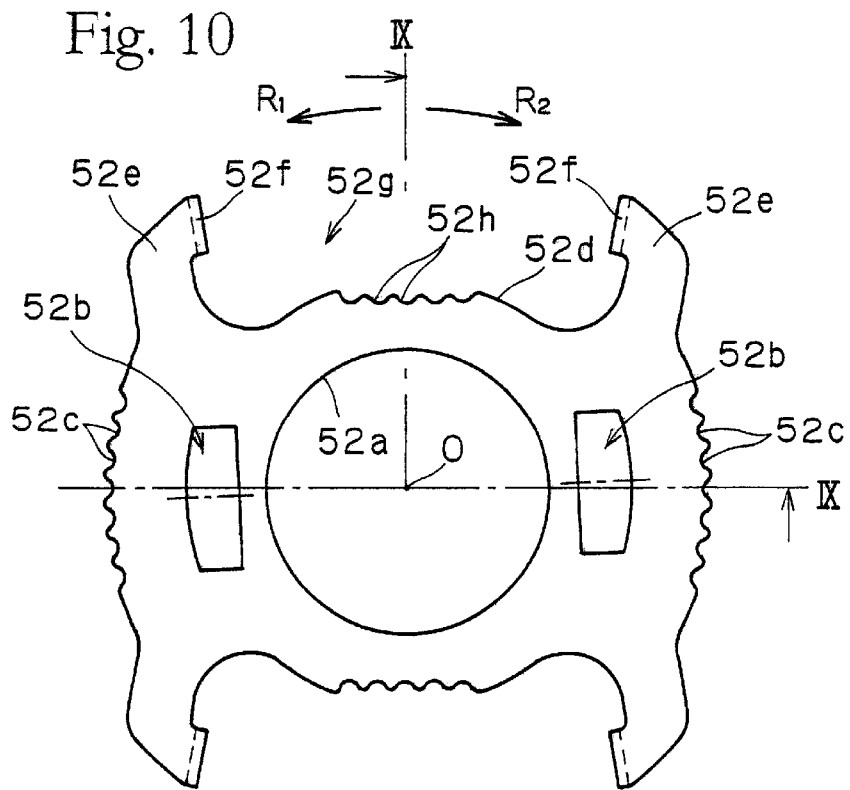
FIG. 10 is elevational view of the second member of the intermediate rotary member.

As seen in FIG. 11, the plate 52 is an annular member disposed between the flange 7b and the retaining plate 13 and made of sheet metal, for example. As shown in FIGS. 9 and 10, the plate 52 is provided with a center hole 52a. The plate 52 is also provided with a pair of window holes 52b that correspond to the window parts 51a. A plurality of semicircular recessed parts 52c is aligned in the rotational direction on the outer edge at positions located radially outward from the window holes 52b. The projecting parts 51d of the bush 51 engage with the recessed parts 52c.

Figure 15:
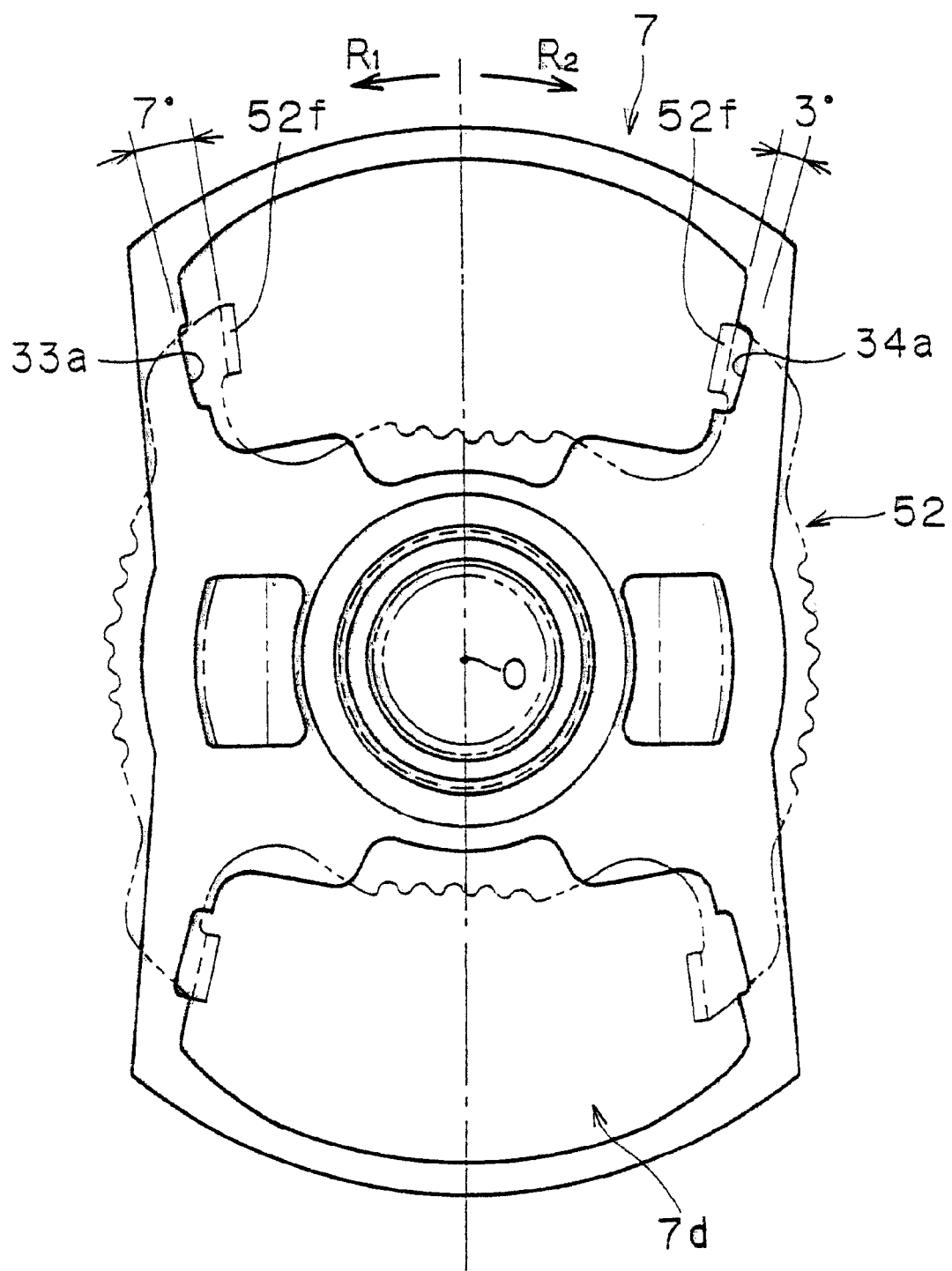
FIG. 15 is an elevational view illustrating positional relationships between the hub flange and the second member of the intermediate rotary member.
Figure 16:
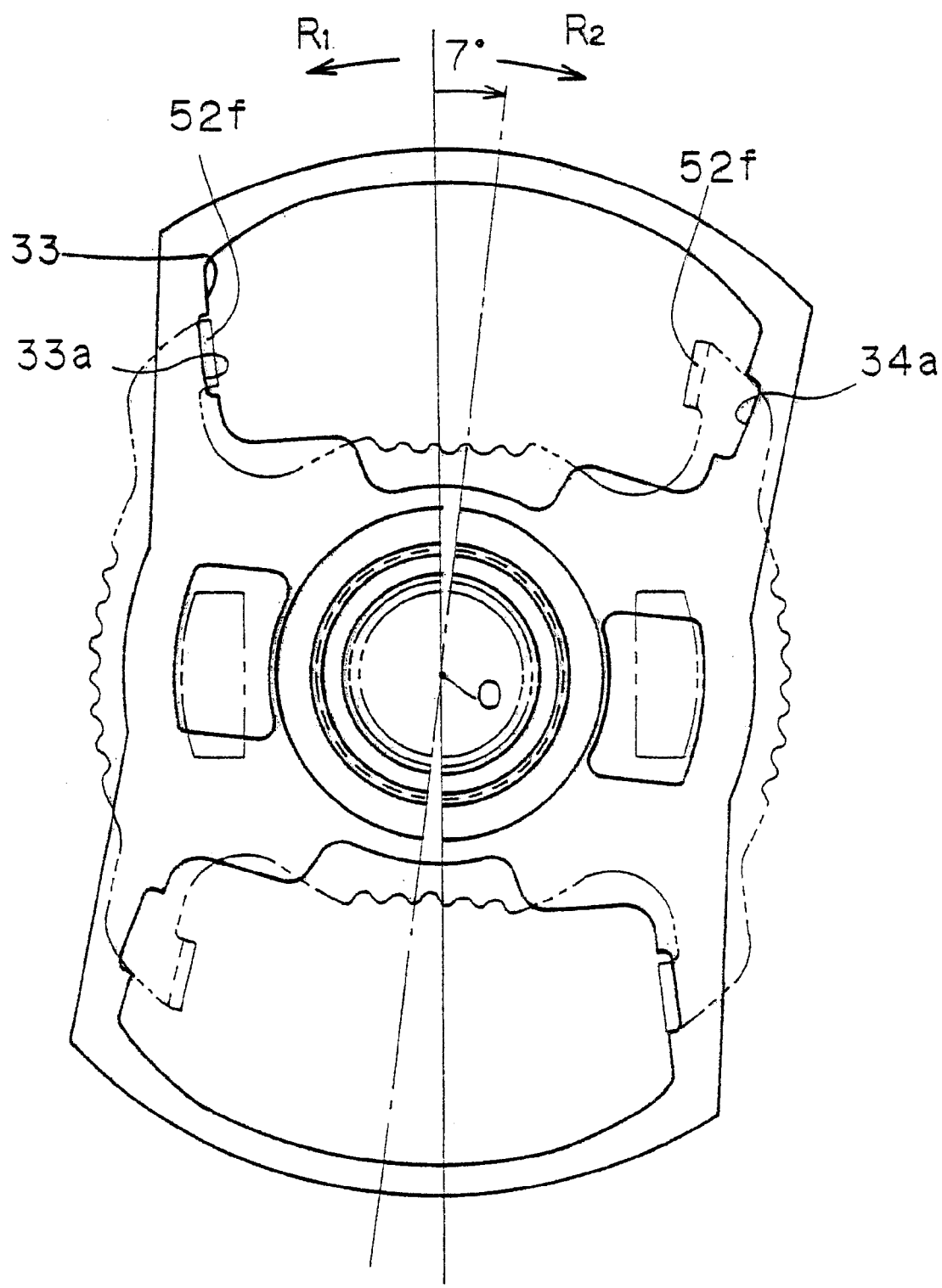
FIG. 16 corresponds to FIG. 15 and serves to illustrate a twisting operation of a damper mechanism of the clutch disk assembly.

A pair of arc-shaped curved surfaces 52d are formed radially opposite each other on the outside edge of the plate 52. Projecting parts 52e that extend outward in the radial direction are formed at both ends of each arc-shaped curved surface 52d. The bent claws 52f that extend in the axial direction are provided on the tips of the projecting parts 52e such that they face each other. As shown in FIG. 13, the surface of each bent claw 52f that faces circumferentially outward touches against one end face 51g of the bush 51. Furthermore, as seen in FIG. 15, the bent claws 52f are formed in correspondence to recessed parts 33a and 34a of the rotation direction support parts 33 and 34. The bent claws 52f can fit into recessed parts 33a and 34a from the rotational direction. The rotational angle or thickness occupied by each bent claw 52f is preferably 2 degrees.

Thus, as seen in FIG. 10, a spring housing space 52g is formed by the curved surface 52d and a pair of the bent claws 52f. A plurality of recessed parts 52h is formed in the center section of curved surface 52d. The recessed parts 52h are configured to engage with the projecting parts 51j of the bush 51. Since the projecting parts 51d and 51j respectively engage with the recessed parts 52c and 52h, the bush 51 and the plate 52 rotate as a single unit.

Figure 12:
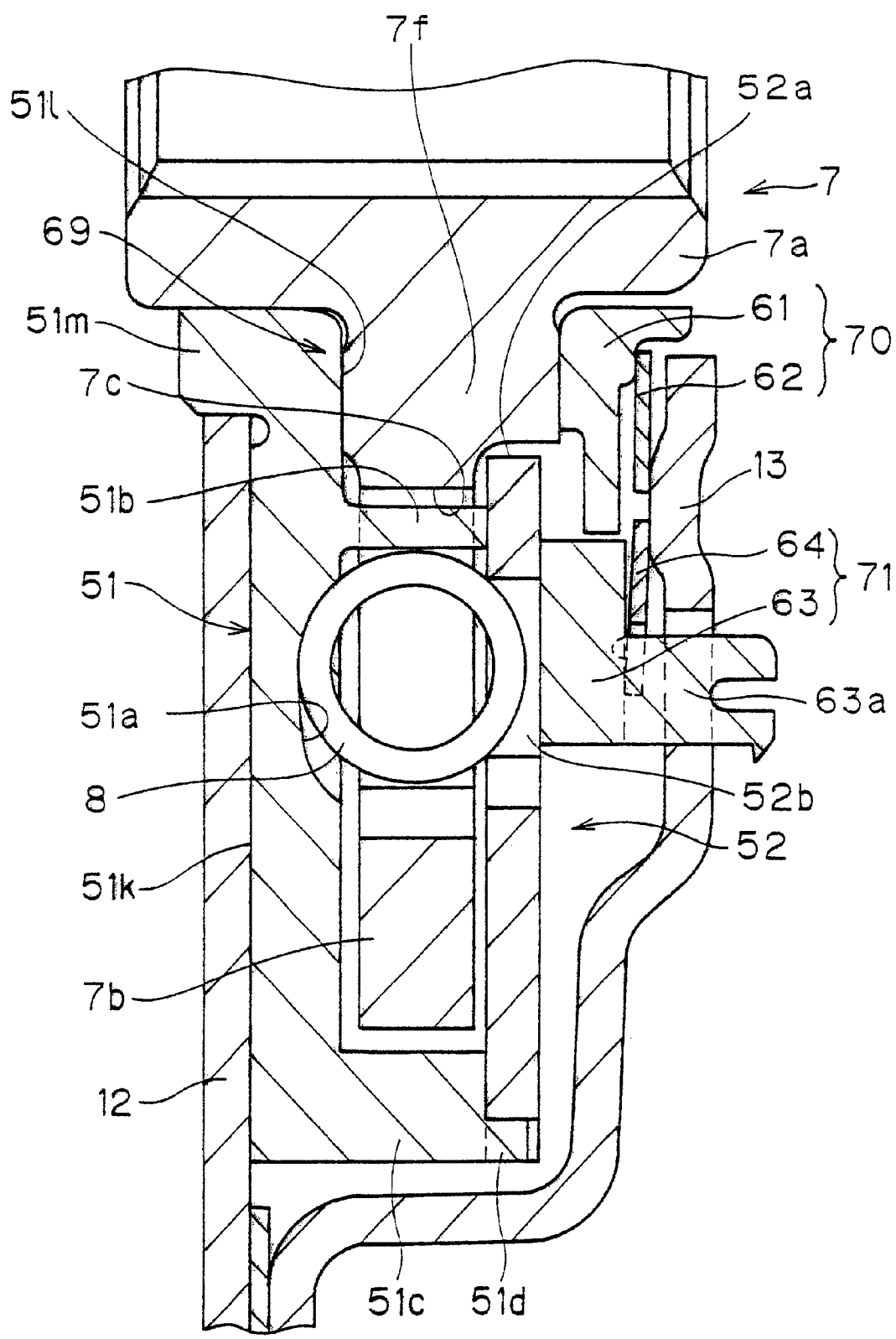
FIG. 12 is an alternate enlarged partial view of FIG. 1.

As previously mentioned, the bush 51 and the plate 52 abut against each other in the axial direction and engage with each other in the rotational direction so as to form a single integrally-rotating member. As seen in FIGS. 11 and 12, the bush 51 and the plate 52 are configured to couple such that the flange 7b is axially disposed therebetween. Since the axial distance between the bush 51 and the plate 52 is larger than thickness of the flange 7b, both axially facing lateral surfaces of the flange 7b are separated from members 51 and 52, respectively.

FIG. 13 shows the relationship between the bush 51 and the plate 52, which constitute the intermediate rotary member 10. The window parts 51a and window holes 52b match each other in terms of position and size and, respectively, serve to support both the circumferentially facing ends and the axially facing outside sections of the coil springs 8. The spring housing spaces 51h and the spring housing spaces 52g also roughly match each other. Further, the end faces 51g and the bent claws 52f are disposed on both circumferentially facing sides of each coil spring assembly 9.

Figure 14:
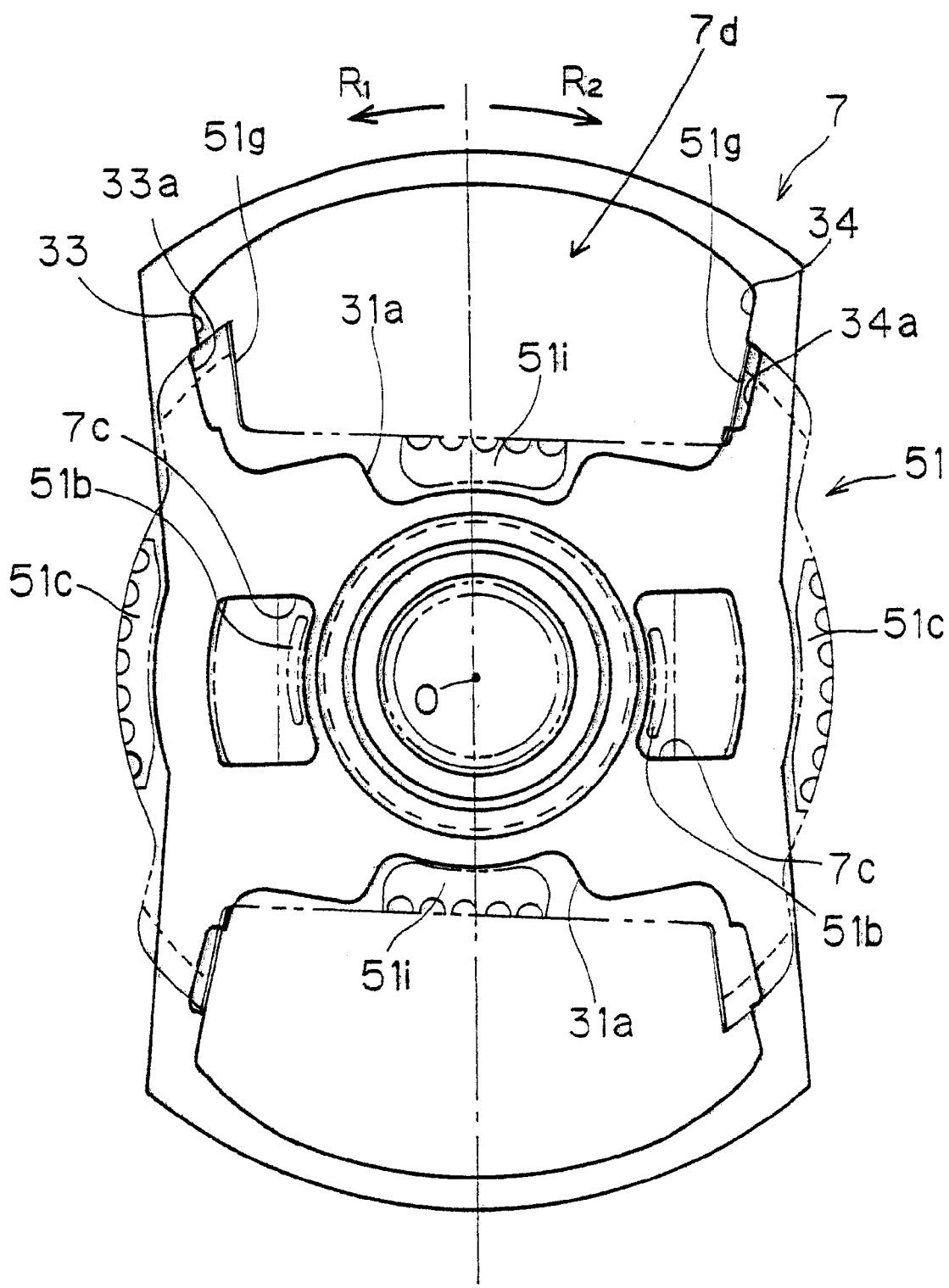
FIG. 14 is an elevational view illustrating positional relationships between the hub flange and the first member of the intermediate rotary member.

Next, the relationship between the intermediate rotary member 10 and the flange 7b is explained using FIGS. 14 and 15. On the R2 side of each second window hole 7d, the end face 51g is aligned with the rotational direction support part 34. Therefore, the bent claw 52f is separated from the recessed part 34a by 3 degrees in the R1 rotational direction. On the R1 side of each second window hole 7d, the end face 51g is separated from the rotational support part 33 by 7 degrees in the R2 direction. Therefore, the bent claw 52f is separated from recessed part 33a by 7 degrees in the R2 direction. The rotationally inward facing surface of each bent claw 52f touches against the rear surface 46b of one of the spring seats 42 and 43.

The intermediate rotary member 10 has two members, i.e., the bush 51 and the plate 52. Further, the bush 51 has protruding parts (51c, 51i, 51b) that engage with the plate 52. Consequently, conventional sub-pins can be omitted and cost can be reduced because there are fewer parts.

Figure 21:
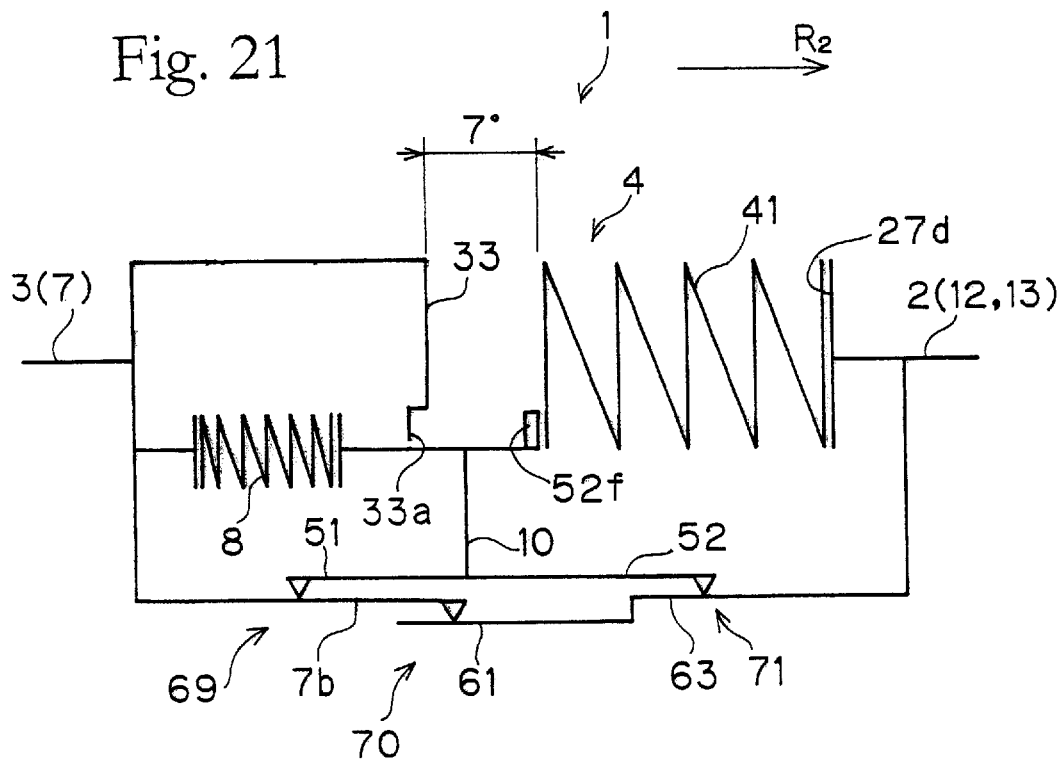
FIG. 21 is a view of a mechanical circuit diagram illustrating constituent features and a twisting operation of the damper mechanism.

Thus constituted as described heretofore and as shown in FIG. 21, the damper mechanism of the clutch disk assembly 1 is arranged so that the low torsional rigidity damper formed by the coil springs 8 and the high torsional rigidity damper formed by the coil spring assemblies 9 of the elastic coupling part 4 operate in series. More specifically, the coil springs 8 elastically couple the hub flange 7 and the intermediate rotary member 10 together in the rotational direction and the coil spring assemblies 9 couple the intermediate rotary member 10 and the plates 12 and 13 together elastically in the rotational direction. The coil springs 8 accomplish a so-called first stage (i.e., a low-rigidity region for absorbing small vibrations during idling) due to their torsional characteristics and the coil springs 41 of the coil spring assembly 9 accomplish a so-called second stage (i.e., a high-rigidity region for damping torsional vibrations during acceleration).

As shown in FIGS. 11 and 12, a first friction plate 61 and a first cone spring 62 are arranged between the retaining plate 13 and the innermost section 7f of the flange 7b. The first friction plate 61 touches against the innermost section 7f of the flange 7b and, as discussed later, rotates integrally with the retaining plate 13. The first cone spring 62 is compressed axially between the first friction plate 61 and the retaining plate 13 and exerts a force against the first friction plate 61 in the axial direction toward the engine. As a result, the first friction plate 61 is always pressed against the innermost section 7f of the flange 7b. The section just described generates sliding resistance between the hub flange 7 and the retaining plate 13, and thus, by extension, generates sliding resistance between the input rotary body 2 and the output rotary body 3. The section just described is hereinafter called "first friction generating mechanism 70."

A second friction plate 63 and a second cone spring 64 are disposed between the plate 52 and the retaining plate 13. The second friction plate 63 engages with the first friction plate 61 in such a manner that the two plates cannot rotate relative to each other. Further, the second friction plate 63 also engages with the retaining plate 13 by means of a claw projection 63a such that it cannot rotate relative thereto. The second cone spring 64 is compressed axially between the second friction plate 63 and the retaining plate 13 and exerts a force on the second friction plate 63 in the axial direction toward the engine. As a result, the second friction plate 63 is pressed strongly against the plate 52 consequently ensuring that the bush 51 is also pressed strongly against the clutch plate 12. The section described here, which generates sliding resistance between the intermediate rotary member 10 and plates 12 and 13, is hereinafter called "second friction generating mechanism 71."

The sliding section between the surface of the intermediate rotary member 10 and the lateral surface of the innermost section 7f of the flange 7b is called "friction generating mechanism 69."

Now the structure is described in further detail. As seen in FIG. 2, the two coil spring assemblies 9 are disposed in two locations that are opposite each other in the radial direction. The reason the number of the coil spring assemblies 9 can be reduced in comparison with conventional damper mechanisms is that the coil springs 41 of the coil spring assemblies 9 do not rotate about their own center axes and, thus, the number of active windings on the side that is closer to the center axis of the clutch disk mechanism can be arranged always to be larger than number of active windings on the side that is farther from the center axis of the clutch disk mechanism. Since the strength and durability of the coil springs 41 are improved, torque capacity of each coil spring can be increased. More specifically, at least one of the two coil spring assemblies 9 can absorb 35% or more (more specifically 35 to 50%) of the twisting torque of the damper mechanism and the two coil spring assemblies 9 can absorb 70% or more (more specifically 70 to 100%) of the twisting torque. Thus, the two coil springs 41 of the present invention provide the same twisting torque and rigidity as, for example, four coil springs in a conventional damper mechanism. Also, since there are only two coil spring assemblies 9, the layout is simpler and the shapes of the hub flange 7, etc., are simpler. This means higher yields during the manufacture of each member. The degree of design freedom for the entire clutch disk is also increased. In short, with this structure, the number of coil spring assemblies can be reduced and the structure of the damper mechanism can be simplified while maintaining the same torsional characteristics as conventional damper mechanisms.

Additionally, since a large space is formed between the two coil spring assemblies 9 in the circumferential direction, the degree of design freedom for the first-stage the coil springs 8, which are located circumferentially-between the coil spring assemblies 9, is improved. More particularly, the two coil springs 8 are positioned midway between the pair of coil springs 9 in the circumferential direction and, thus, are not restricted by the coil springs 9 in the radial direction. For example, the small coil springs 8 can be positioned farther from the center axis of the clutch disk assembly 1 than in the case of conventional damper mechanisms. Alternatively, larger diameter springs can be used then than in conventional damper mechanisms.

(2) Operation

Figure 22:
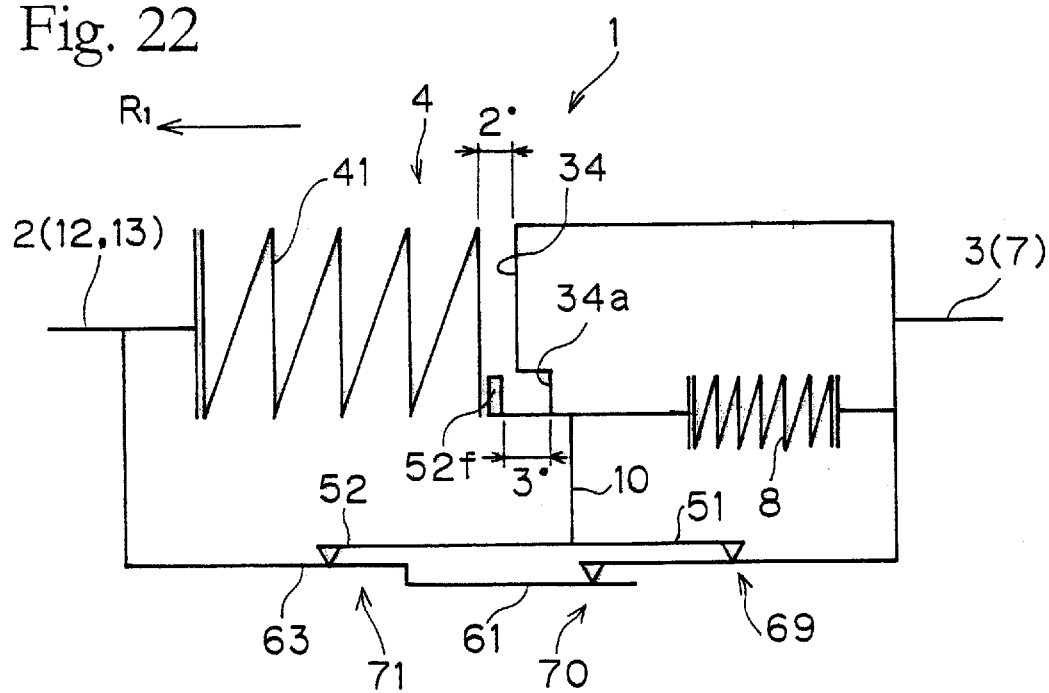
FIG. 22 is a view of a mechanical circuit diagram illustrating the constituent features and twisting operation of the damper mechanism.

Next, the twisting operation of the damper mechanism of the clutch disk assembly 1 is explained. As seen in FIGS. 21 and 22, it is assumed that the plates 12 and 13 are twisted in the rotational direction with respect to the hub flange 7 from a free state. In the region of small twisting angles, the coil springs 8, which have a very low relative rigidity, will be compressed between the hub flange 7 and the intermediate rotary member 10 and a low-rigidity characteristic will be obtained. When this occurs, the intermediate rotary member 10 and the plates 12 and 13 will rotate relative to the hub flange 7 and, consequently, only friction generating mechanism 69 and first friction generating mechanism 70 will operate such that the desired low hysteresis torque is generated. If all members of a stopper mechanism of the first stage touch against each other, then the coil spring assemblies 9 will be compressed between the hub flange 7 and the plates 12 and 13. When this occurs, the hub flange 7 will rotate relative to the plates 12 and 13 and, as a result, both the first friction mechanism 70 and the second friction mechanism 71 will operate such that the desired high hysteresis torque is generated.

The coil springs 41 of the coil spring assemblies 9 are compressed in the rotational direction between rotational direction support parts 33 of the second window holes 7d and the bent claws 52f of the intermediate rotary member 10 on one end and the rotation direction support parts 27c or 27d of the window parts 25 on the other. When this occurs, the deflection of each coil spring 41 is larger on the side that is farther from the center axis of the clutch disk assembly 1 than on the side that is closer to the center axis of the clutch disk assembly 1. However, since the number of windings on the side that is closer to the center axis is larger than number of windings on the side that is farther from the center axis, the difference in the per-winding deflection between the two sides is smaller than in conventional damping mechanisms. That is, the per-winding deflection on the side that is farther from the center axis is larger than per-winding deflection on the side that is closer to the center axis, but the difference between the two is smaller than in conventional damping mechanisms. As a result, it is difficult for there to be a difference in the generated stress between the portion of the coil spring 41 that is closer to the center axis of the clutch disk assembly 1 and the portion that is farther from the center axis of the clutch disk assembly 1. In other words, there is little difference between the stress generated in the portion of each winding that is farther from the center axis of the clutch disk assembly 1 and the stress generated in the portion of each winding that is closer to the center axis of the clutch disk assembly 1. As a result, the life of the coil spring 41 is extended.

Also, as seen in FIG. 2, the angle occupied by each coil spring 41 in the circumferential direction (i.e., the angle formed by two radii passing from center axis O—O to the ends of the coil spring 41 on the side of the coil spring that is closest to the center axis) is roughly 80 degrees. When the angle occupied in the circumferential direction by the linear coil springs is 60 degrees or larger, the coil springs are larger than in conventional damper mechanisms. Thus, the number of coil springs can be reduced and the structure of the damper mechanism can be simplified while maintaining the same or similar torsional characteristics as conventional damper mechanisms. However, it is best to keep this circumferential angle as small as possible from the standpoint of securing space between the coil springs 41 in the circumferential direction. A good effect can be obtained if the circumferential angle occupied by the coil springs 41 is in the range from 60 to 140 degrees. Furthermore, it is better if the circumferential angle is in the range from 60 to 120 degrees or, still more preferable, in the range from 70 to 100 degrees.

Figure 23:
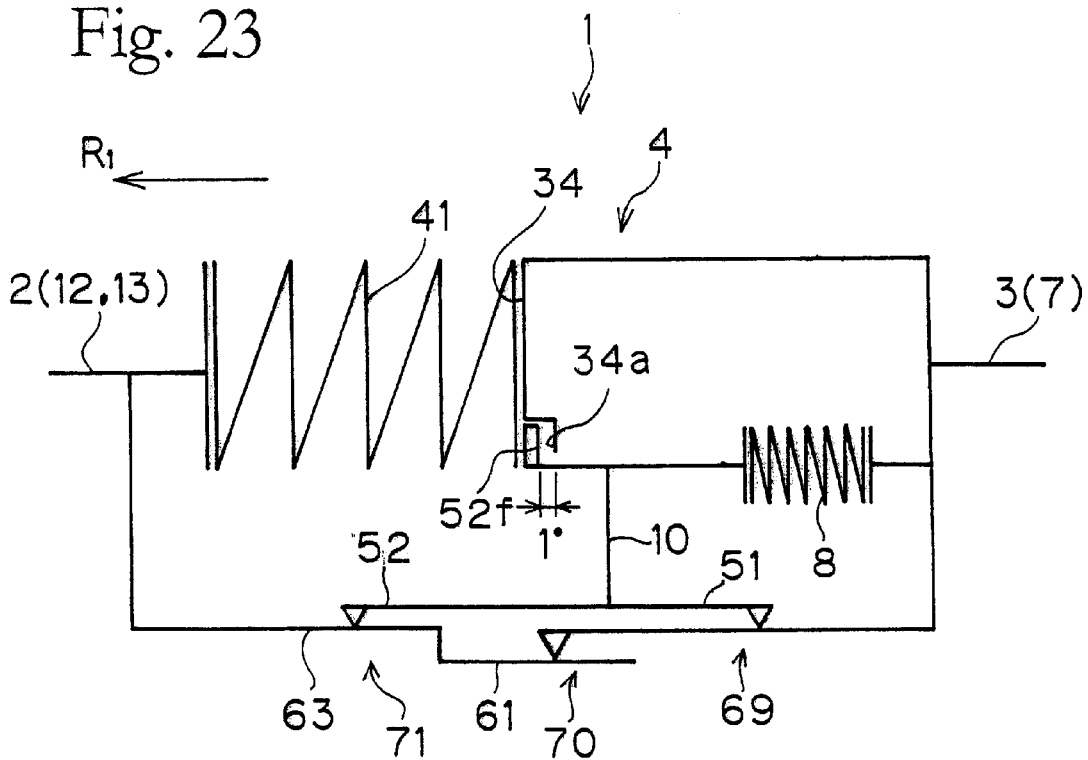
FIG. 23 is a view of a mechanical circuit diagram illustrating the constituent features and twisting operation of the damper mechanism.
Figure 24:
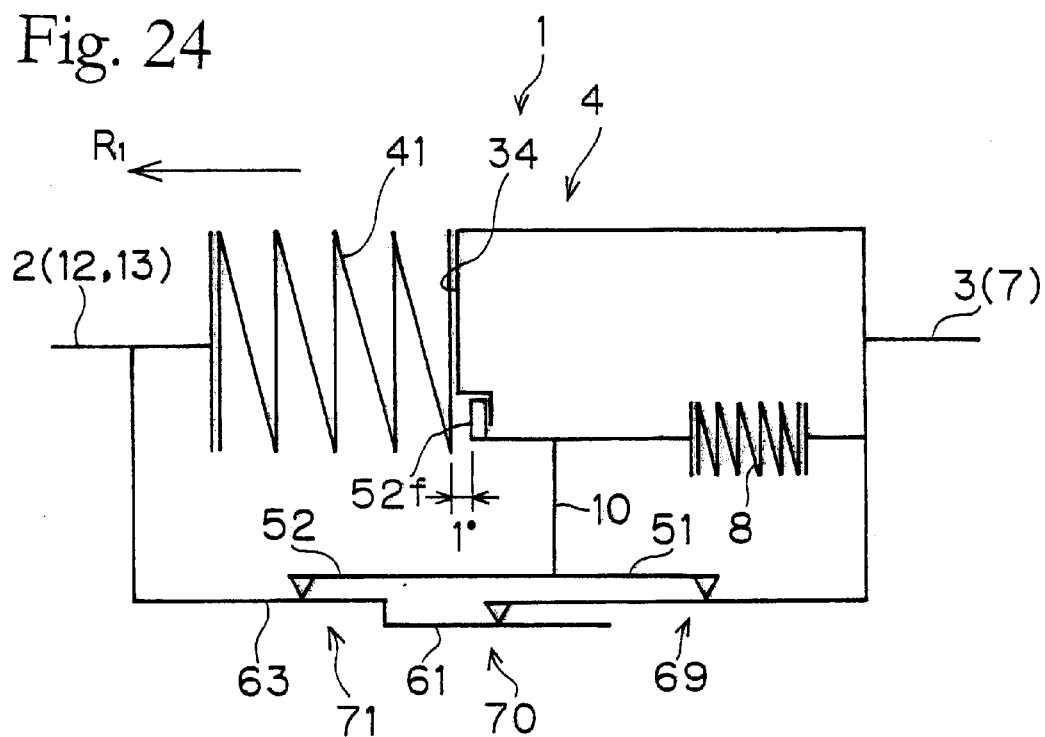
FIG. 24 is a view of a mechanical circuit diagram illustrating the constituent features and twisting operation of the damper mechanism.
Figure 25:
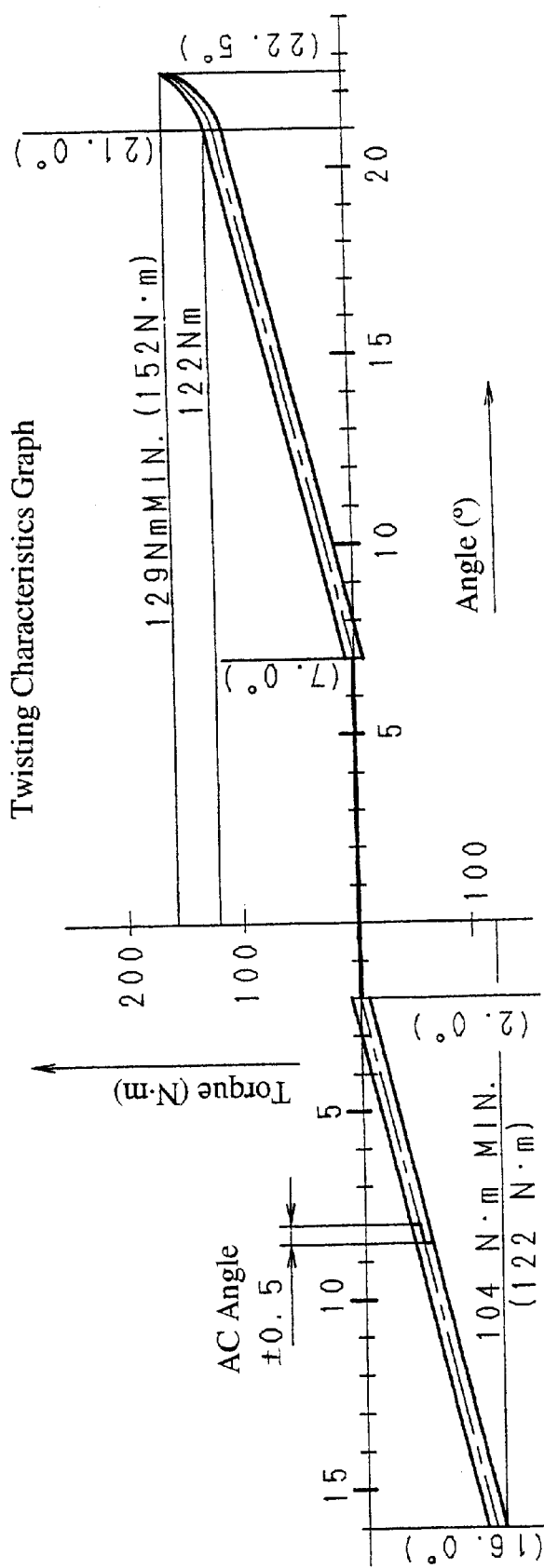
FIG. 25 is a view of a torsional characteristic diagram for the damper mechanism.

Next, the twisting operation of the clutch disk assembly 1 is explained based on FIGS. 14 to 19 (these figures are used to explain the positional relationship between the hub flange 7 and the plate 52), FIGS. 20 to 23 (mechanical circuit drawings), and FIG. 24 (torsional characteristic diagram).

Assume that, starting from the neutral state shown in FIGS. 14 and 21, the hub flange 7 is rotated in the R2 rotational direction with respect to the other members. In other words, a positive-side operational state is achieved in which the plates 12 and 13 are twisted in the R1 direction with respect to the hub flange 7. When the twisting angle reaches 7 degrees, the clutch disk assembly 1 is in the state shown in FIG. 16. When this occurs, the bent claw 52f on the R1 side touches against the recessed part 33a and, in the elevational view, lies in the same plane with the rotational support part 33. Therefore, when the twisting angle is 7 degrees or larger (i.e., when in the second stage of the positive side of the torsional characteristic), the intermediate rotary member 10 always rotates integrally with the hub flange 7. Therefore, in the second friction generating mechanism 71, the plate 52 and the second friction plate 63 slide against each other and high hysteresis torque is generated.

Figure 17:
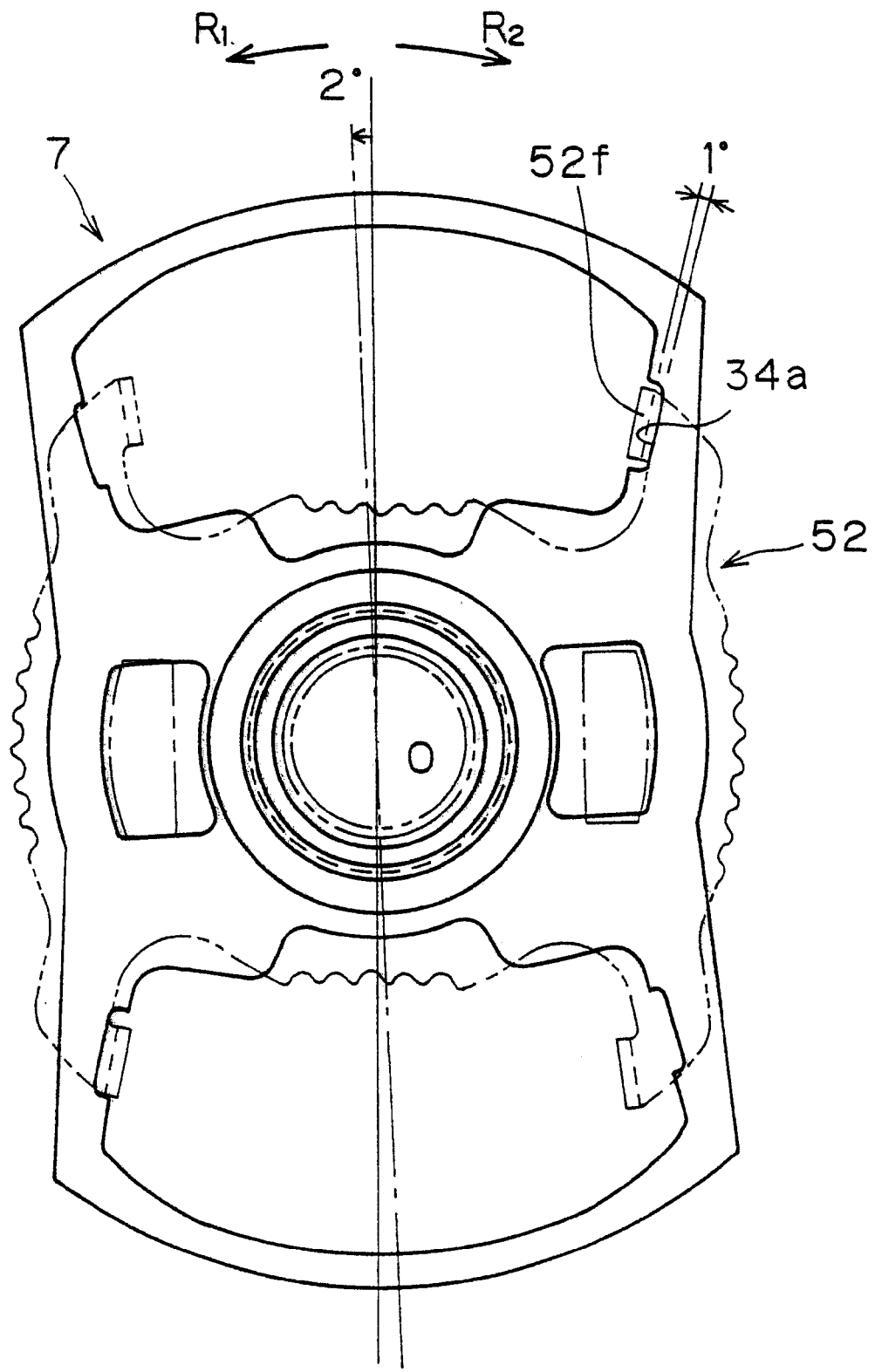
FIG. 17 corresponds to FIG. 15 and serves to illustrate the twisting operation of the damper mechanism.

Now assume that, starting from the neutral state shown in FIGS. 14, 18, and 22, the hub flange 7 is rotated in the R1 rotational direction with respect to the other members. In other words, a negative-side operational state is achieved in which the plates 12 and 13 are twisted in the R2 direction with respect to the hub flange 7. When the twisting angle reaches 2 degrees, the clutch disk assembly 1 is in the state shown in FIG. 23 and the rotational direction support part 34 of the hub flange 7 touches against the rear surface 46b of the spring seat 43. When this occurs, as shown in FIGS. 17, 19, and 23, the bent claw 52f on the R2 side is coplanar with the surface of the rotational direction support part 34 and has a 1-degree gap with respect to the bottom surface of the recessed part 34a. When the twisting angle increases one more degree, the bent claws 52f touch against recessed parts 34a and, conversely, a 1-degree gap is secured between the bent claws 52f and the rear surface 46b of the spring seat 43 of the coil springs 41. Therefore, if small torsional vibrations within 1 degree in magnitude are inputted while in the state shown in FIG. 24 (second stage, negative side), the torque of the coil springs 41 act on the hub flange 7 but not on the intermediate rotary member 10 and, consequently, the plate 52 and the second friction plate 63 of second friction generating mechanism 71 do not slide against each other. This means that high hysteresis torque is not generated in response to small torsional vibrations when the clutch disk assembly 1 is operating in the second stage region on the negative side of the torsional characteristic.

Next, while referring to the torsional characteristic diagram of FIG. 24, the torsional characteristic of the clutch disk assembly 1 is described for specific cases in which different types of vibrations are inputted.

During idling, the clutch disk assembly 1 fluctuates repeatedly between first stages of the positive and negative sides of the torsional characteristic in response to the small torsional vibrations. The small torsional vibrations are absorbed by the low rigidity, low hysteresis torque characteristic.

When torsional vibrations having a large amplitude—such as longitudinal vibrations of the vehicle—occur, the clutch disk assembly 1 fluctuates repeatedly across the full range of both the positive and negative sides of the torsional characteristic. In such a case, the longitudinal vibrations of the vehicle are quickly damped by high rigidity, high hysteresis torque generated by the second stage on both the positive and negative sides of the torsional characteristic.

Next consider a case in which engine combustion fluctuations cause small torsional vibrations to be delivered to the clutch disk assembly 1 when, for example, the vehicle is being decelerated by engine braking. In this case, the intermediate rotary member 10 rotates relative to the hub flange 7 within the 1-degree rotational gap shown in FIGS. 20 and 24 and does not slide against the second friction plate 63. Consequently, high hysteresis torque is not generated in response to the small vibrations. Even if the coil springs 41 operate within the range of the 1-degree rotational gap indicated in the torsional characteristic diagram, sliding does not occur in the second friction generating mechanism 71 and only low hysteresis torque is obtained. It is preferred that the low hysteresis torque be roughly ¹⁄₁₀ the size of the hysteresis torque across the entire torsional characteristic. In this way, the vibrations and noise level associated with engine breaking can be greatly reduced because a rotational gap has been provided on the negative side of the torsional characteristic such that the second friction generating mechanism 71 does not operate within a prescribed angular range.

Since a rotational gap that prevents the second friction generating mechanism 71 from operating within a prescribed angular range is not provided on the positive side of the torsional characteristic, there is no degradation of the noise and vibration performance in the vicinity of the resonance rotational speed in such vehicles as front-engine front-drive or FF vehicles, in which the resonance peak often remains in the region of practical engine speeds.

In short, the noise and vibration performance for both acceleration and deceleration is improved by securing a rotational gap that prevents the friction mechanism from operating within a prescribed angular range on only one side, i.e., the positive side or negative side, of the torsional characteristic.

As described heretofore, the damper mechanism of the present invention achieves an overall preferred torsional characteristic by not only having different torsional rigidities on the positive and negative sides of the torsional characteristic but also providing on only one side of the torsional characteristic a structure that does not allow high hysteresis torque to be generated in response to small torsional vibrations.

Second Embodiment

A damper disk assembly in accordance with a second embodiment will now be explained. Moreover, the descriptions of the parts of the second embodiment that are identical to the parts of the first embodiment may be omitted for the sake of brevity.

The structure used to stop the coil springs from rotating about their own axes with respect to the plate and hub flange is not limited to that used in the previous embodiments. For example, the coil springs can be stopped from rotating about their own axes with respect to said members without using spring seats. Also, even if spring seats are used, the structure used to stop the spring seats from rotating about the spring axes with respect to the plate and hub flange is not limited to that used in the previous embodiments.

The end windings of the coil springs may be ground as in the previous embodiment, but it is also acceptable if the end windings are not ground at all.

In the previous embodiment, the end parts of the coil springs were close-ended but it is also acceptable to use open-ended coil springs. Also, the number of windings, the winding direction, and the cross sectional shape of the coil springs are not limited to those used in the previous embodiments.

The constituent features of the clutch disk assembly are not limited to those of the previous embodiments.

The damper disk assembly described in the present application can be used in other power transmission devices in addition to clutch disk assemblies. For example, the present invention can be applied to a flywheel assembly that elastically couples two flywheels together in the rotational direction or to a lockup device for a torque converter.

Effects of the Invention

The damper disk assembly of the present invention uses a pair of second elastic members arranged in positions opposite each other in the radial direction as the springs for transmitting torque and absorbing vibrations when the vehicle is traveling. Therefore, such problems as the angle restriction that occurs between stop pins and notches are solved and a wide twisting angle torsional characteristic is achieved.

Meanwhile, a pair of first elastic members arranged in the first window holes of the flange is used as the spring for absorbing small torsional vibrations during idling. The hub and flange are integrated as a single unit, thus keeping down the number of parts.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least±5% of the modified term if this deviation would not negate the meaning of the word it modifies.

This application claims priority to Japanese Patent Application No. 2001-342079. The entire disclosure of Japanese Patent Application No. 2001-342079 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper disk assembly comprising:
a hub flange having a boss being configured to be coupled to a shaft and a flange being formed integrally on an outer circumference of said boss, said flange having formed therein only a pair of first window holes arranged radially opposite each other and only a pair of second window holes arranged radially opposite each other;
a pair of first elastic members being arranged respectively in said pair of first window holes;
a pair of second elastic members having a higher rigidity than said first elastic members and being arranged respectively in said pair of second window holes;
an intermediate rotary member being configured to couple said first elastic members and said second elastic members together in the rotational direction; and
a pair of plate members arranged on both axially facing sides of said flange and having a support part that supports said second elastic members.

2. The damper disk assembly according to claim 1, wherein
said intermediate rotary member comprises a first member arranged on one axially facing side of said flange and a second member arranged on an opposite axially facing side of said flange and having a protruding part that protrudes toward said first member in an axial direction and engages with said first member such that the two members cannot rotate relative to each other.

3. A clutch disk assembly comprising:
an input rotary member comprising window parts;
an output rotary member being configured to rotate relatively to said input rotary member, said output rotary member comprising,
a hub flange having a boss being configured to be coupled to a shaft,
and a flange being formed integrally on an outer circumference of said boss, said flange having formed therein only a pair of first window holes arranged radially opposite each other and only a pair of second window holes arranged radially opposite each other;
an elastic coupling part being configured to couple elastically said input rotary member and said output rotary member, said elastic coupling part comprising,
a pair of first elastic members being arranged respectively in said pair of first window holes,
a pair of second elastic members having a higher rigidity than said first elastic members and being arranged respectively in said pair of second window holes and said window parts; and
an intermediate rotary member being configured to rotate relatively to said input rotary member and said output rotary member, said intermediate rotary member being configured to couple said first elastic members and said second elastic members together in the rotational direction.

4. The clutch disk assembly according to claim 3, wherein said intermediate rotary member comprises,
a first member arranged on one axially facing side of said flange, and
a second member arranged on an opposite axially facing side of said flange and having a protruding part that protrudes toward said first member in an axial direction and engages with said first member such that the two members cannot rotate relative to each other.

5. The clutch disk assembly according to claim 4, further comprising,
a friction generating mechanism configured to generate sliding resistance between said intermediate rotary member and said input rotary member, wherein said first elastic member and said second elastic member are configured to operate in series.

6. The clutch disk assembly according to claim 4, wherein said first member comprises intermediate window holes and housing spaces, and
said second member comprises intermediate window parts and linear parts corresponding to said intermediate window holes and housing spaces, said window parts configured to be recesses in an axial direction of said second member,
said intermediate window holes are arranged such that a line passing through centers thereof forms an acute angle with a line passing through the centers of the housing spaces, said first elastic members are arranged in said intermediate window holes and said intermediate window parts and said second elastic members are arranged in said housing spaces and said linear parts.

7. The clutch disk assembly according to claim 6, wherein said acute angle is eighty-eight degrees.

8. A clutch disk assembly comprising:
an input rotary member comprising window parts;
an output rotary member being configured to rotate relatively to said input rotary member, said output rotary member comprising,
   a hub flange having a boss being configured to be coupled to a shaft,
   and a flange being formed integrally on an outer circumference of said boss,
said flange having formed therein a pair of first window holes arranged radially opposite each other and a pair of second window holes arranged radially opposite each other;
an elastic coupling part being configured to couple elastically said input rotary member and said output rotary member, said elastic coupling part comprising,
   a pair of first elastic members being arranged respectively in said pair of first window holes,
   a pair of second elastic members having a higher rigidity than said first elastic members and being arranged respectively in said pair of second window holes and said window parts;
an intermediate rotary member being configured to rotate relatively to said input rotary member and said output rotary member, said intermediate rotary member being configured to couple said first elastic members and said second elastic members together in the rotational direction;
a first friction generating mechanism being configured to generate low hysteresis torque; and
a second friction generating mechanism being configured to generate high hysteresis torque, said low hysteresis torque being configured to be one tenth that of a sum said high hysteresis torque and said low hysteresis torque.

9. A clutch disk assembly comprising;
an input rotary member comprising window parts;
an output rotary member being configured to rotate relatively to said input rotary member, said output rotary member comprising,
   a hub flange having a boss being configured to be coupled to a shaft,
   and a flange being formed integrally on an outer circumference of said boss,
said flange having formed therein a pair of first window holes arranged radially opposite each other and a pair of second window holes arranged radially opposite each other an elastic coupling part being configured to couple elastically said input rotary member and said output rotary member, said elastic coupling part comprising,
   a pair of first elastic members being arranged respectively in said pair of first window holes,
   a pair of second elastic members having a higher rigidity than said first elastic members and being arranged respectively in said pair of second window holes and said window parts;
an intermediate rotary member being configured to rotate relatively to said input rotary member and said output rotary member, said intermediate rotary member being configured to couple said first elastic members and said second elastic members together in the rotational direction;
a friction generating mechanism being configured to generate sliding resistance between said intermediate rotary member and said input rotary member; and
a rotational gap being configured to prevent said friction generating mechanism from operating within a prescribed angular range.

10. The clutch disk assembly according to claim 9, wherein said prescribed angular range of said rotational gap is one degree.

11. The clutch disk assembly according to claim 10, wherein
said rotational gap is configured to operate in only one direction of relative rotation between said intermediate rotary member and said input rotary member.

12. The clutch disk assembly according to claim 11, wherein
said pair of first elastic members comprise first coil springs and said pair of second elastic members comprise second coil springs.

13. The clutch disk assembly according to claim 12, wherein
said second coil springs are arranged to be non-rotatable around its axis and to have a larger number of active windings on a radial side closer to a center axis of rotation of said clutch disk assembly than a radial side farther from said center axis.

14. The clutch disk assembly according to claim 13, wherein
each of said second coil spring is arranged to occupy a circumferential angle measured from said center axis of 60 to 140 degrees.

15. The clutch disk assembly according to claim 14, wherein
each of said second coil spring is arranged to occupy a circumferential angle measured from said center axis of 60 to 120 degrees.

16. The clutch disk assembly according to claim 15, wherein
each of said second coil spring is arranged to occupy a circumferential angle measured from said center axis of 70 to 100 degrees.

17. The clutch disk assembly according to claim 11, wherein
at least one of said second elastic member is configured to absorb at least 35% of a twisting torque of said clutch disk assembly.

18. The clutch disk assembly according to claim 17, wherein
at least one of said second elastic members is configured to absorb 70% of said twisting torque.

19. A clutch disk assembly comprising:
an input rotary member comprising window parts;
an output rotary member being configured to rotate relatively to said input rotary member, said output rotary member comprising,
   a hub flange having a boss being configured to be coupled to a shaft,
   and a flange being formed integrally on an outer circumference of said boss,
said flange having formed therein a pair of first window holes arranged radially opposite each other, said first window holes having a first recessed part formed in a first rotational support part and a second recessed part formed in a second rotational support part, and a pair of second window holes arranged radially opposite each other;

an elastic coupling part being configured to couple elastically said input rotary member and said output rotary member, said elastic coupling part comprising,
- a pair of first elastic members being arranged respectively in said pair of first window holes,
- a pair of second elastic members having a higher rigidity than said first elastic members and being arranged respectively in said pair of second window holes and said window parts;

an intermediate rotary member being configured to rotate relatively to said input rotary member and said output rotary member, said intermediate rotary member being configured to couple said first elastic members and said second elastic members together in a rotational direction said intermediate rotary member comprising,
- a first member being arranged on one axially facing side of said flange, said first member having bent claws being configured to contact ends of said second elastic members in a rotational direction, said bent claws being configured to fit into said first and second recessed parts in said rotational direction,
- a second member being arranged on an opposite axially facing side of said flange and having a protruding part protruding toward said first member in an axial direction and engaging with said first member, said first and second members being non-rotatable relative to each other.

20. The clutch disk assembly according to claim 19, wherein
said first recessed part is configured to occupy a first circumferential angle relative to a center axis of rotation of said clutch disk assembly that corresponds to a circumferential thickness of said bent claw and said second recessed part is configured to occupy a second circumferential angle relative to said center axis that is larger than said circumferential thickness of said bent claw.

21. The clutch disk assembly according to claim 20, wherein
said second circumferential angle is one degree larger than said circumferential thickness of said bent claw.

22. The clutch disk assembly according to claim 21, wherein
a first rotational angular gap relative to said center axis is secured between said first rotational support part and a corresponding end of said second elastic member, and a second rotational angular gap relative to said center axis is secured between said second rotational support and a corresponding end of said second elastic member.

23. The clutch disk assembly according to claim 22, wherein
said first rotational angular gap is seven degrees and said second rotational angular gap is two degrees.

* * * * *